United States Patent
Takahashi

(10) Patent No.: US 6,325,486 B1
(45) Date of Patent: Dec. 4, 2001

(54) IMAGE RECORDING METHOD

(75) Inventor: Hiromitsu Takahashi, Iwate-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 09/291,867

(22) Filed: Apr. 14, 1999

(30) Foreign Application Priority Data

| Apr. 16, 1998 | (JP) | 10-105969 |
| Apr. 23, 1998 | (JP) | 10-113252 |
| May 14, 1998 | (JP) | 10-131917 |

(51) Int. Cl.$^7$ .................................................. B41J 2/15
(52) U.S. Cl. .................................................. 347/41; 347/40
(58) Field of Search .................................. 347/40, 41, 43, 347/9, 20, 47, 54, 57, 12

(56) References Cited

U.S. PATENT DOCUMENTS

| 5,353,387 | 10/1994 | Petschik et al. | 358/19 |
| 5,384,587 | * 1/1995 | Takagi et al. | 347/41 |
| 5,500,661 | 3/1996 | Matsubara et al. | 347/41 |
| 5,692,843 | * 12/1997 | Furuya | 347/43 |
| 5,956,055 | * 9/1999 | Gibson et al. | 347/40 |

FOREIGN PATENT DOCUMENTS

| 41 27 560 A1 | 2/1993 | (DE) . |
| 0 575 057 A2 | 12/1993 | (EP) . |
| 0 645 247 A1 | 3/1995 | (EP) . |
| 0 745 484 A1 | 5/1996 | (EP) . |
| 0 798 663 A2 | 10/1997 | (EP) . |
| 6-8532 | 1/1994 | (JP) . |
| 6-270453 | 9/1994 | (JP) . |

* cited by examiner

*Primary Examiner*—N. Le
*Assistant Examiner*—Lamson D. Nguyen
(74) *Attorney, Agent, or Firm*—Brinks Hofer Gilson & Lione

(57) ABSTRACT

An image recording method performs recording using an upper band as a recording area formed by one scan of a recording head, and a lower band as a recording area formed by the next scan of the recording head so as to overlap in a plurality of dots, and performs assignment of recording data in the overlapping area to the upper and lower bands. The assignment includes successively identifying each dot of the recording head in the scanning direction thereof; providing successive flags to the dots when the dots have the recording data; and assigning, to the upper band and the lower band, the recording data in the successive dots provided with the successive flags only when no recording data is detected. In addition, when the assignment is performed, the recording data in the successive dots provided with the successive flags are divided into two groups in the scanning direction of the recording head. Moreover, when the assignment is performed, from among the recording data in the successive dots provided with the successive flags, the recording data in at least one dot is extracted and added to another dot in the scanning direction which has no recording data.

7 Claims, 40 Drawing Sheets

PROCESS 0   UPPER BAND   ✕

LOWER BAND   ✕

PROCESS 1  UPPER BAND  ○

LOWER BAND  ×

FIG. 12

| | | |
|---|---|---|
| PROCESS 2 | UPPER BAND | ×○ |
| | LOWER BAND | ○× |
| PROCESS 3 | UPPER BAND | ×○○ |
| | LOWER BAND | ○×× |
| PROCESS 4 | UPPER BAND | ×○○○ |
| | LOWER BAND | ○××× |
| PROCESS 5 | UPPER BAND | ×○○○○ |
| | LOWER BAND | ○×××× |

FIG. 14

| | | |
|---|---|---|
| PROCESS 6 | UPPER BAND | ○○○○○○ |
| | LOWER BAND | ○○○×× × |
| PROCESS 7 | UPPER BAND | ○○○○○○○ |
| | LOWER BAND | ○○○×× × × |
| PROCESS 8 | UPPER BAND | ○○○○○○○○ |
| | LOWER BAND | ○○○×× × × × |
| PROCESS 9 | UPPER BAND | ○○○○○○○○○ |
| | LOWER BAND | ○○○×× × × × × |
| PROCESS 10 | UPPER BAND | ○○○○○○○○○○ |
| | LOWER BAND | ○○○×× × × × × × |
| PROCESS 11 | UPPER BAND | ○○○○○○○○○○○ |
| | LOWER BAND | ○○○×× × × × × × × |
| PROCESS 12 | UPPER BAND | ○○○○○○○○○○○○ |
| | LOWER BAND | ○○○×× × × × × × × × |
| PROCESS 13 | UPPER BAND | ○○○○○○○○○○○○○ |
| | LOWER BAND | ○○○×× × × × × × × × × |
| PROCESS 14 | UPPER BAND | ○○○○○○○○○○○○○○ |
| | LOWER BAND | ○○○×× × × × × × × × × × |

FIG. 16

PROCESS 15  UPPER BAND  O × O × O × O × O × O × O × O ×
OR GREATER  LOWER BAND  × O × O × O × O × O × O × O × O

FIG. 23

| | | |
|---|---|---|
| NUMBER OF SUCCESSIVE FLAGS 2 | UPPER BAND | ×○ |
| | LOWER BAND | ○× |
| NUMBER OF SUCCESSIVE FLAGS 4 | UPPER BAND | ××○○ |
| | LOWER BAND | ○○×× |
| NUMBER OF SUCCESSIVE FLAGS 6 | UPPER BAND | ×××○○○ |
| | LOWER BAND | ○○○××× |
| NUMBER OF SUCCESSIVE FLAGS 8 | UPPER BAND | ××××○○○○ |
| | LOWER BAND | ○○○○×××× |
| NUMBER OF SUCCESSIVE FLAGS 10 | UPPER BAND | ×××××○○○○○ |
| | LOWER BAND | ○○○○○××××× |
| NUMBER OF SUCCESSIVE FLAGS 12 | UPPER BAND | ××××××○○○○○○ |
| | LOWER BAND | ○○○○○○×××××× |
| NUMBER OF SUCCESSIVE FLAGS 14 | UPPER BAND | ×××××××○○○○○○○ |
| | LOWER BAND | ○○○○○○○××××××× |

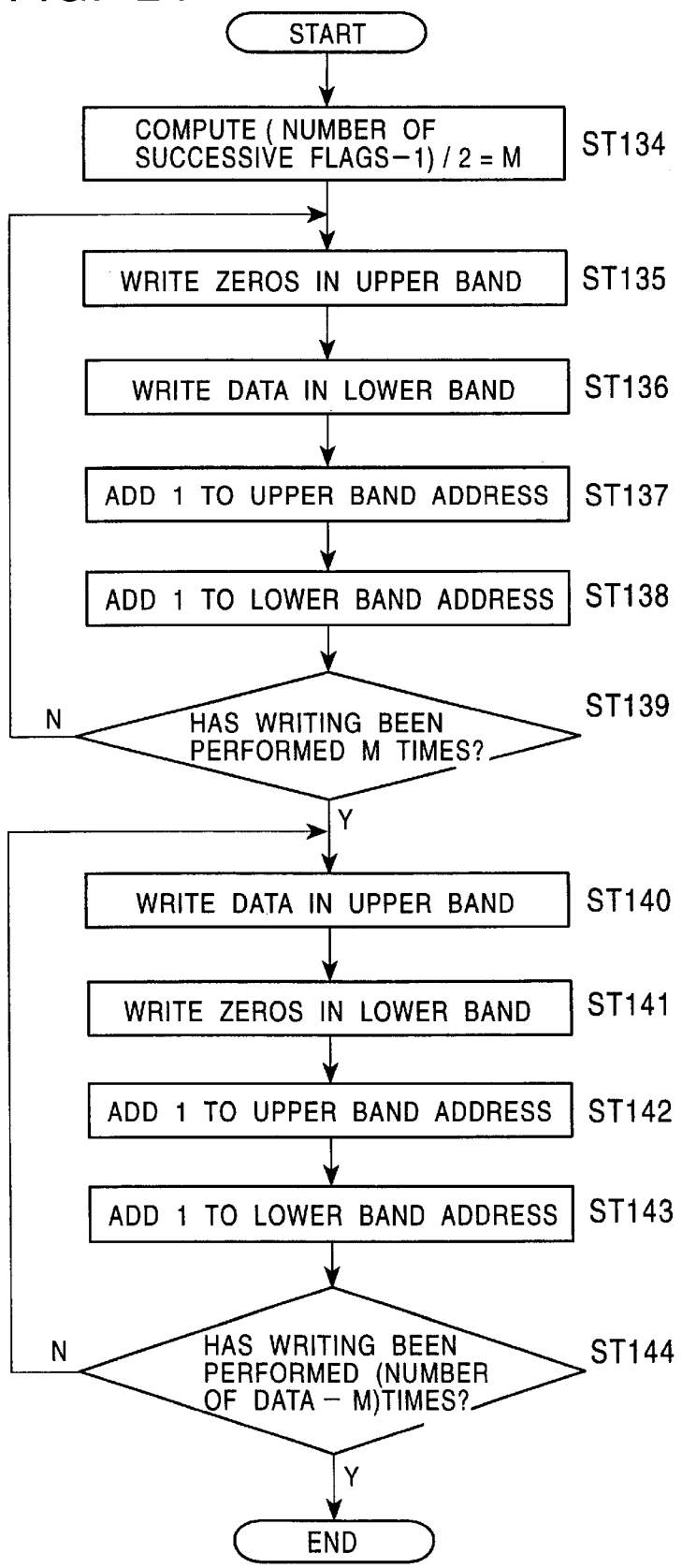

FIG. 25

| NUMBER OF SUCCESSIVE FLAGS 1 | UPPER BAND | × |
| | LOWER BAND | ○ |

| NUMBER OF SUCCESSIVE FLAGS 3 | UPPER BAND | × ○ ○ |
| | LOWER BAND | ○ × × |

| NUMBER OF SUCCESSIVE FLAGS 5 | UPPER BAND | × × ○ ○ ○ |
| | LOWER BAND | ○ ○ × × × |

| NUMBER OF SUCCESSIVE FLAGS 7 | UPPER BAND | × × × ○ ○ ○ ○ |
| | LOWER BAND | ○ ○ ○ × × × × |

| NUMBER OF SUCCESSIVE FLAGS 9 | UPPER BAND | × × × × ○ ○ ○ ○ ○ |
| | LOWER BAND | ○ ○ ○ ○ × × × × × |

| NUMBER OF SUCCESSIVE FLAGS 11 | UPPER BAND | × × × × × ○ ○ ○ ○ ○ ○ |
| | LOWER BAND | ○ ○ ○ ○ ○ × × × × × × |

| NUMBER OF SUCCESSIVE FLAGS 13 | UPPER BAND | × × × × × × ○ ○ ○ ○ ○ ○ ○ |
| | LOWER BAND | ○ ○ ○ ○ ○ ○ × × × × × × × |

| NUMBER OF SUCCESSIVE FLAGS 15 | UPPER BAND | × × × × × × × ○ ○ ○ ○ ○ ○ ○ |
| | LOWER BAND | ○ ○ ○ ○ ○ ○ ○ × × × × × × × |

FIG. 27

PROCESS 0   UPPER BAND   ×
            LOWER BAND   ×

FIG. 28

| NUMBER OF SUCCESSIVE FLAGS 2 | UPPER BAND | ○× |
| | LOWER BAND | ×○ |
| NUMBER OF SUCCESSIVE FLAGS 4 | UPPER BAND | ○○×× |
| | LOWER BAND | ××○○ |
| NUMBER OF SUCCESSIVE FLAGS 6 | UPPER BAND | ○○○××× |
| | LOWER BAND | ×××○○○ |
| NUMBER OF SUCCESSIVE FLAGS 8 | UPPER BAND | ○○○○×××× |
| | LOWER BAND | ××××○○○○ |
| NUMBER OF SUCCESSIVE FLAGS 10 | UPPER BAND | ○○○○○××××× |
| | LOWER BAND | ×××××○○○○○ |
| NUMBER OF SUCCESSIVE FLAGS 12 | UPPER BAND | ○○○○○○×××××× |
| | LOWER BAND | ××××××○○○○○○ |
| NUMBER OF SUCCESSIVE FLAGS 14 | UPPER BAND | ○○○○○○○××××××× |
| | LOWER BAND | ×××××××○○○○○○○ |

| | | |
|---|---|---|
| NUMBER OF SUCCESSIVE FLAGS 1 | UPPER BAND | ○ |
| | LOWER BAND | × |
| NUMBER OF SUCCESSIVE FLAGS 3 | UPPER BAND | ○ × × |
| | LOWER BAND | × ○ ○ |
| NUMBER OF SUCCESSIVE FLAGS 5 | UPPER BAND | ○ ○ × × × |
| | LOWER BAND | × × ○ ○ ○ |
| NUMBER OF SUCCESSIVE FLAGS 7 | UPPER BAND | ○ ○ ○ × × × × |
| | LOWER BAND | × × × ○ ○ ○ ○ |
| NUMBER OF SUCCESSIVE FLAGS 9 | UPPER BAND | ○ ○ ○ ○ × × × × × |
| | LOWER BAND | × × × × ○ ○ ○ ○ ○ |
| NUMBER OF SUCCESSIVE FLAGS 11 | UPPER BAND | ○ ○ ○ ○ ○ × × × × × × |
| | LOWER BAND | × × × × × ○ ○ ○ ○ ○ ○ |
| NUMBER OF SUCCESSIVE FLAGS 13 | UPPER BAND | ○ ○ ○ ○ ○ ○ × × × × × × × |
| | LOWER BAND | × × × × × × ○ ○ ○ ○ ○ ○ ○ |
| NUMBER OF SUCCESSIVE FLAGS 15 | UPPER BAND | ○ ○ ○ ○ ○ ○ ○ × × × × × × × |
| | LOWER BAND | × × × × × × × ○ ○ ○ ○ ○ ○ ○ |

|  |  | POSITIVE<br>SCREEN ANGLE | NEGATIVE<br>SCREEN ANGLE |
|---|---|---|---|
| ○ ○ | → UPPER BAND | ○ × × × | × × × ○ |
|  | → LOWER BAND | × × × ○ | ○ × × × |

FIG. 41

|  | POSITIVE SCREEN ANGLE | NEGATIVE SCREEN ANGLE |
|---|---|---|
| UPPER BAND | ○ ○ ✕ ✕ | ✕ ✕ ✕ ○ |
| LOWER BAND | ✕ ✕ ✕ ○ | ○ ○ ✕ ✕ |

| PROCESS 0 | UPPER BAND | X |
|---|---|---|
|  | LOWER BAND | X |

IMAGE RECORDING METHOD

BACKGROUND OF THE INVENTION

1. Field of the Invention

The present invention relates to image recording methods, and in particular, to an image recording method in which the upper and lower bands of a recording head are overlapped for recording, and recording data for a plurality of dots in the overlapping recording area are assigned to the upper and lower bands when recording is performed.

2. Description of the Related Art

In general, thermal transfer printers are widely used as output apparatuses for computers, word processors, etc., because of high recording quality, low noise, low cost, and ease of maintenance.

In these typical thermal transfer printers, paper is supported in front of a platen, and a heating-element-formed thermal head is mounted on a carriage. While the thermal head and the carriage are reciprocally moved along the platen when an ink ribbon and the paper are supported between the thermal head and the platen, the ink ribbon is reeled out, and power is selectively supplied, based on recording information, to the heating elements, whereby a portion of ink is transferred from the ink ribbon onto the paper so that images such as the desired characters are recorded on the paper.

These thermal transfer printers have problems in that, due to paper feeding errors or the like, an area recorded by one scan of the thermal head, and an area recorded by the next scan are so close to each other that a so-called "black line" is generated, and in that the areas are conversely so far apart that a so-called "white line" is generated.

By way of example, in the case where basic dots comprised of N×M dithering matrix are used as basic cells, and recording is performed at a negative screen angle, with the basic cells used so as to be shifted downward in the scanning direction of the thermal head, when the feeding amount of the paper is approximate, as shown in FIG. 54, the distance between a recording area (upper band) formed by one scan of the thermal head, and a recording area (lower band) formed by the next scan of the thermal head, is uniform.

When the feeding amount of the paper is too small as shown in FIG. 55, the distance between the upper and lower bands narrows to generate a black line. When the feeding amount of the paper is too large, the distance between the upper and lower bands increases to generate a white line. The generated black line and white line are visually undesirable, and greatly affect recording image quality.

Accordingly, in order to prevent black lines and while lines from being generated, a conventional recording method is employed in which the upper and lower bands overlap.

FIG. 57 shows the outline of the conventional recording method. According to the conventional recording method, when a thermal head has, for example, 240 heating dots, recording is performed using an upper band and a lower band to overlap so that the 237th, 238th, 239th, and 240th dots in the upper band respectively correspond to the 1st, 2nd, 3rd, and 4th dot in the lower band. Recording data for the four common dots are assigned to the upper and lower bands.

In assignment of the recording data, in the overlapping recording area (for four bits), while the dots of the thermal head in the arrangement direction (column direction) are being identified, recording data are assigned for each column to the upper and lower bands. In other words, in the case where all four dots in the first column have recording data, as shown in FIG. 57, among the data in the four dots, the first and second dot data are assigned to the upper band, and the third and fourth dot data are assigned to the lower band. In the second column, the first dot data is assigned to the upper band, and the third and fourth dot data are assigned to the lower band. In the third column, the first dot is assigned to the lower band.

As described above, the conventional recording method performs recording in an overlapping recording area by appropriately assigning, for each column, recording data in the dots of a thermal head to upper and lower bands, and driving, based on the assigned recording data, heating elements as the dots.

The conventional thermal transfer printers have a problem in that the processing amount of recording data is extremely large, substantially delaying processing speed since the recording data in dots are assigned for each column. Therefore, in recording that must process a large amount of recording data, such as the case where multigradation recording is performed by controlling, for example, a time for supplying power to the heating dots of a thermal head, and changing the diameter of each dot, a further problem occurs in that high speed recording cannot be performed because the processing of the recording data is insufficient so that recording speed is reduced.

SUMMARY OF THE INVENTION

Accordingly, it is an object of the present invention to provide an image recording method for performing high speed recording by greatly increasing recording-data processing speed and for obtaining high-quality recording images by preventing white lines and black lines from appearing in images.

It is another object of the present invention to provide an image recording method for providing a simplified technique of assigning recording data, compared with a conventional technique of assigning recording data for each column, and for easily and rapidly processing recording data by substantially reducing the amount of processing.

It is still another object of the present invention to provide an image recording method for performing the fixed-form assignment of recording data in accordance with a plurality of groups of successive flags provided to the dots having the recording data.

It is a further object of the present invention is to provide an image recording method for using three colors, cyan, magenta, and yellow to perform the appropriate recording of full color images.

It is a still further object of the present invention to provide an image recording method for performing the appropriate recording of monochrome images by assigning monochrome recording data.

To these ends, according to an aspect of the present invention, the foregoing objects are achieved through provision of an image recording method including the steps of feeding recording paper so that recording is performed by using an upper band as a recording area formed by one scan of a recording head, and a lower band as a recording area formed by the next scan of the recording head so as to overlap in a plurality of dots; performing assignment of recording data in the dots in the overlapping recording area to the upper band and the lower band; and driving, based on the assigned recording data, the recording elements of the recording head to perform recording; wherein the assignment includes the steps of successively identifying each dot of the recording head in the scanning direction thereof; providing successive flags to the dots when the dots have the recording data; and assigning, to the upper band and the lower band, the recording data in the successive dots provided with the successive flags only when no recording data is detected.

According to another aspect of the present invention, the foregoing objects are achieved through provision of an image recording method including the steps of feeding recording paper so that recording is performed by using an upper band as a recording area formed by one scan of a recording head, and a lower band as a recording area formed by the next scan of the recording head so as to overlap in a plurality of dots; performing assignment of recording data in the dots in the overlapping recording area to the upper band and the lower band; and driving, based on the assigned recording data, the recording elements of the recording head to perform recording; wherein the assignment includes the steps of successively identifying each dot of the recording head in the scanning direction thereof; providing successive flags to the dots when the dots have the recording data; and dividing, into two groups, the recording data in the successive dots provided with the successive flags only when no recording data is detected, and assigning the groups to the upper band and the lower band.

According to a further aspect of the present invention, the foregoing objects are achieved through provision of an image recording method including the steps of feeding recording paper so that recording is performed by using an upper band as a recording area formed by one scan of a recording head, and a lower band as a recording area formed by the next scan of the recording head so as to overlap in a plurality of dots; performing assignment of recording data in the dots in the overlapping recording area to the upper band and the lower band; and driving, based on the assigned recording data, the recording elements of the recording head to perform recording; wherein the assignment includes the steps of successively identifying each dot of the recording head in the scanning direction thereof; providing successive flags to the dots when the dots have the recording data; extracting the recording data in at least one dot from among the recording data in the successive dots provided with the successive flags only when no recording data is detected, and adding the extracted recording data to another dot in the scanning direction which has no recording data; and assigning the extracted and added recording data to the upper band and the lower band.

According to the present invention, recording in the scanning direction of a recording head by dots arranged at appropriate intervals is performed. This prevents black lines and white lines from being generated in recording images, whereby extremely high-quality recording images can be obtained, even if the distance between a upper band and a lower band increases or decreases due to paper feeding errors.

According to the present invention, also dots arranged at appropriate intervals are positioned in the direction of each column. This prevents black lines and white lines from being generated in recording images, whereby extremely high-quality recording images can be obtained, even if a paper feeding pitch increases or decreases.

According to the present invention, recording so that the positions of recording-data-extracted dots are blank and recording-data-added dots cover upper dots is performed. This prevents black lines from clearly appearing, even if the distance between a upper band and a lower band decreases due to paper feeding errors. In addition, recording is performed so that recording-data-added dots delete blanks. This prevents white lines from clearly appearing, whereby very high-quality images can be obtained, even if the distance between the upper and lower bands increases.

According to the present invention, when recording is performed at a positive screen angle, dots having added lower-raster recording data covers successive left dots in a upper raster, and the positions of recording-data-extracted dots are blank. This prevents white lines from clearly appearing, even if a paper feeding pitch decreases. When recording is performed at a negative angle, successive left dots in a lower raster cover dots having added upper-raster recording data, and the positions of recording-data-extracted dots are blank, which prevents black lines from clearly appearing. In either case where the screen angle is positive or negative, recording is performed so that added right dots delete a blank between the upper and lower rasters. This prevents white lines from clearly appearing, even if the paper feeding pitch increases.

BRIEF DESCRIPTION OF THE DRAWINGS

FIG. 12 is a drawing showing results of assignment by processes 2 to 5 shown in FIG. 11.

FIG. 14 is a drawing showing results of assignment by processes 6 to 14 shown in FIG. 13.

FIG. 16 is a drawing showing results of assignment by process 15 or greater shown in FIG. 15.

FIG. 23 is a drawing showing results of assignment by the even-number processing shown in FIG. 21.

FIG. 24 is a flowchart processing at a negative screen angle in the odd-number processing shown in FIG. 21.

FIG. 25 is a drawing showing results of assignment by the odd-number processing shown in FIG. 24.

FIG. 27 is a drawing showing results of assignment by process 0.

FIG. 28 is a drawing showing processing at a positive screen angle in the even-number processing shown in FIG. 21.

FIG. 29 is a drawing showing results of assignment by processing at a positive screen angle in the odd-number processing shown in FIG. 21.

FIG. 38 is a drawing showing results of assignment by process 2 shown in FIG. 37.

FIG. 41 is a drawing showing results of assignment by process 3 shown in FIG. 37.

DESCRIPTION OF THE PREFERRED EMBODIMENTS

The addresses of the columns in the upper and lower bands are incremented by one (steps ST277 and ST278), Embodiments of the present invention are described below with reference to the attached drawings.

Figure 1:
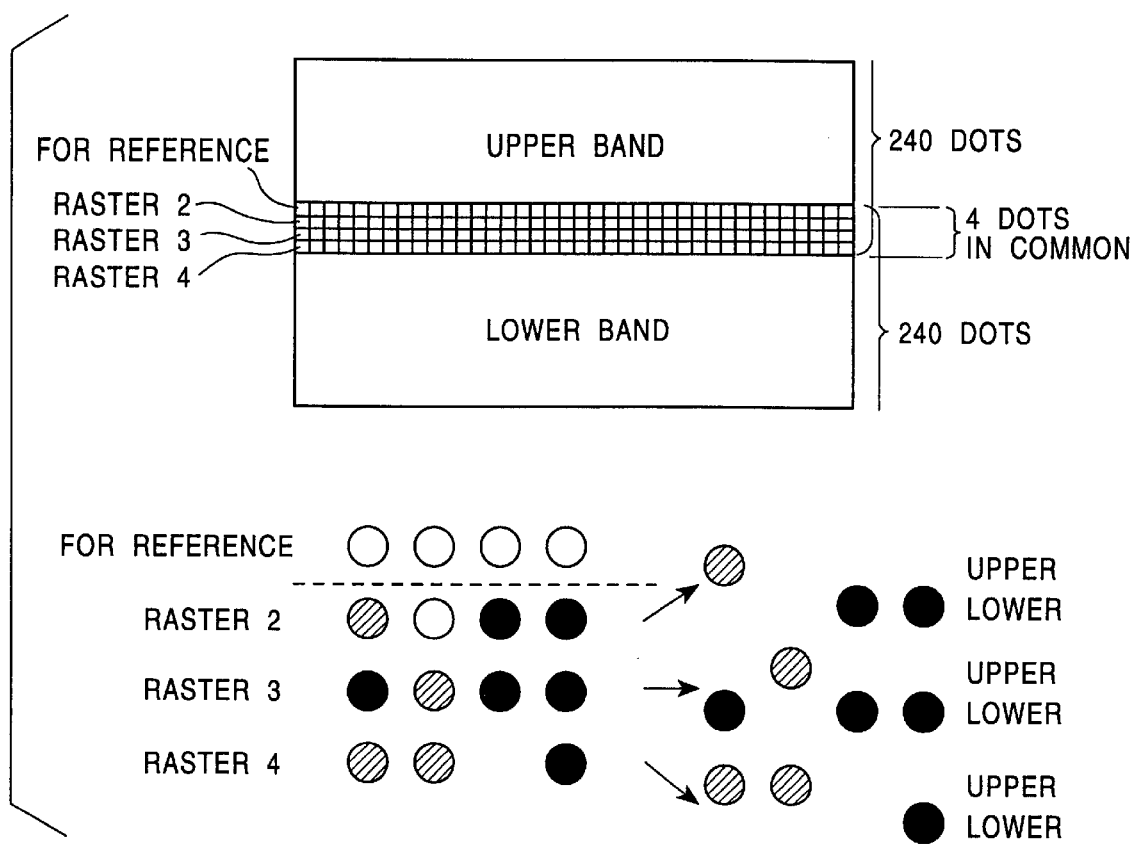
FIG. 1 is a drawing showing an image recording method according to an embodiment of the present invention.

In these embodiments, recording is performed so that a recording area (upper band) formed by one recording-head scan overlaps with a recording area (lower band) formed by the next recording-head scan, as shown in FIG. 1.

By way of example, in the case where a thermal head has 240 heating dots, the thermal head performs recording so that the 237th, 238th, 239th, and 240th dots in the upper band correspond to the 1st, 2nd, 3rd, and 4th dots in the lower band. In the four dot positions, the 237th (1st) dot is used as a reference dot, and the 238th (2nd), 239th (3rd), and 240th (4th) dots are assigned to the upper and lower bands.

In this embodiment, while dots in the scanning direction (raster direction) are being identified, the dots in the overlapping recording area are assigned to the upper and lower bands.

Next, concerning a means for assigning the dots of the overlapping area to the upper and lower bands, a first embodiment of the present invention is described below with reference to FIGS. 2 to 16.

Figure 2:
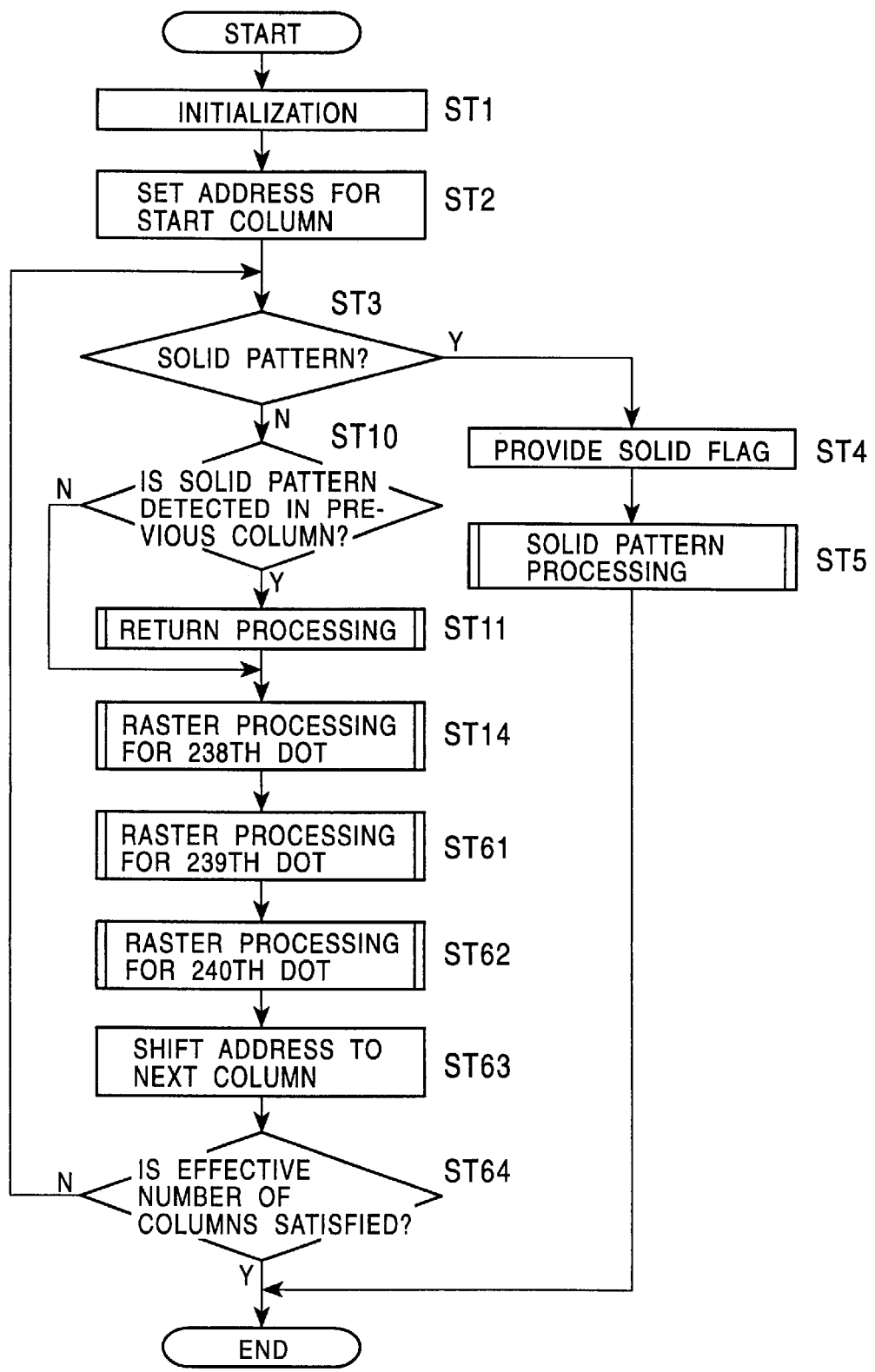
FIG. 2 is a flowchart showing the assignment of recording data in an image recording method of the present invention.

Referring to FIG. 2, a memory for storing data, and a control circuit are initialized (step ST1) before an address is set for a dot in an outermost (start) column in which recording is performed in the overlapping area (step ST2).

It is determined whether the dots of the start column are in a solid pattern (step ST3). The solid pattern is a pattern that should be recorded at a maximum gradation. In the case where all dots in the column direction are solid, it is determined that the dots are in a solid pattern.

Figure 3:
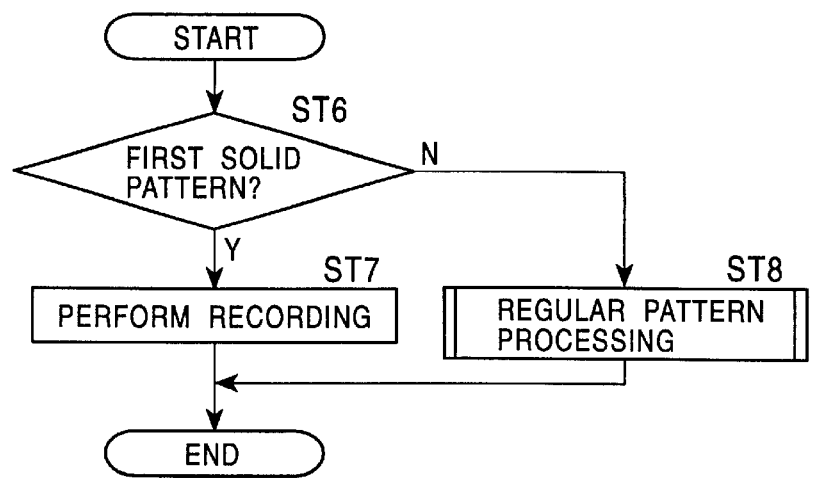
FIG. 3 is a flowchart showing the solid-pattern processing shown in FIG. 2.
Figure 5:
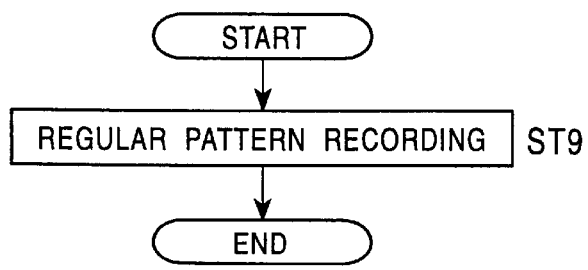
FIG. 5 is a flowchart showing the regular pattern processing shown in FIG. 3.

If the dots of the columns are in a solid pattern, a solid flag is provided (step ST4), and solid pattern processing is performed (step ST5). In the solid pattern processing, it is determined whether the detected solid pattern is a first solid pattern (step ST6), as shown in FIG. 3. If the detected solid pattern is a first solid pattern, the dots in the column direction are assigned to, e.g., the upper band, as dots in which recording is performed at a maximum gradation (step ST7). Obviously, the dots in the column direction may be assigned to the lower band. If the detected solid pattern is not a first pattern, regular pattern processing is performed (step ST8). In the regular pattern processing, some dots are subtracted from, for example, the dots in the column direction, and only the dots in which recording is performed are assigned to, e.g., the upper band, as dots in which recording is performed at a maximum gradation (step ST9), as shown in FIG. 5.

Figure 4:
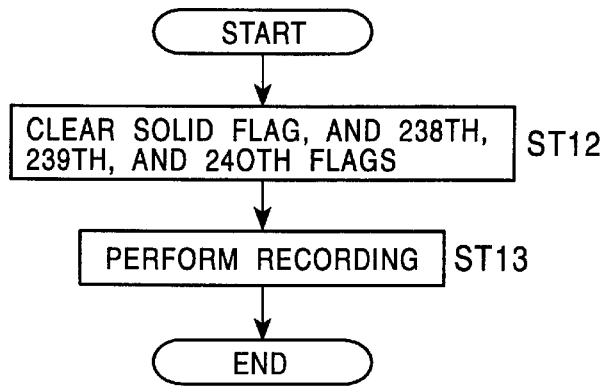
FIG. 4 is a flowchart showing the return processing shown in FIG. 2.

As shown in FIG. 2, the dots of the column are not in a solid pattern, it is determined whether the dots of the previous column are in a solid pattern (step ST10). If the dots of the previous column are in a solid pattern, return processing is performed (step ST11). In the return processing, solid flags are cleared (step ST12), and the dots of the previous column are assigned to, e.g., the upper band, as dots in which recording is performed at a maximum gradation (step ST13), as shown in FIG. 4. In other words, a recording area using a solid pattern is set up such that in the first and last columns for the solid pattern, recording by all the dots is performed, and that in intermediate columns between them, recording by the subtracted columns is performed. Recording by all the dots in the first and last columns for the solid pattern is performed in order that in a pattern such as a solid pattern rectangle, stitched part of a side may not be lost. The reason that recording by the subtracted dots in the intermediate columns is performed is that if recording by all the dots in the intermediate columns is performed, a recording is so thick that a so-called "black line" is generated.

Figure 6:
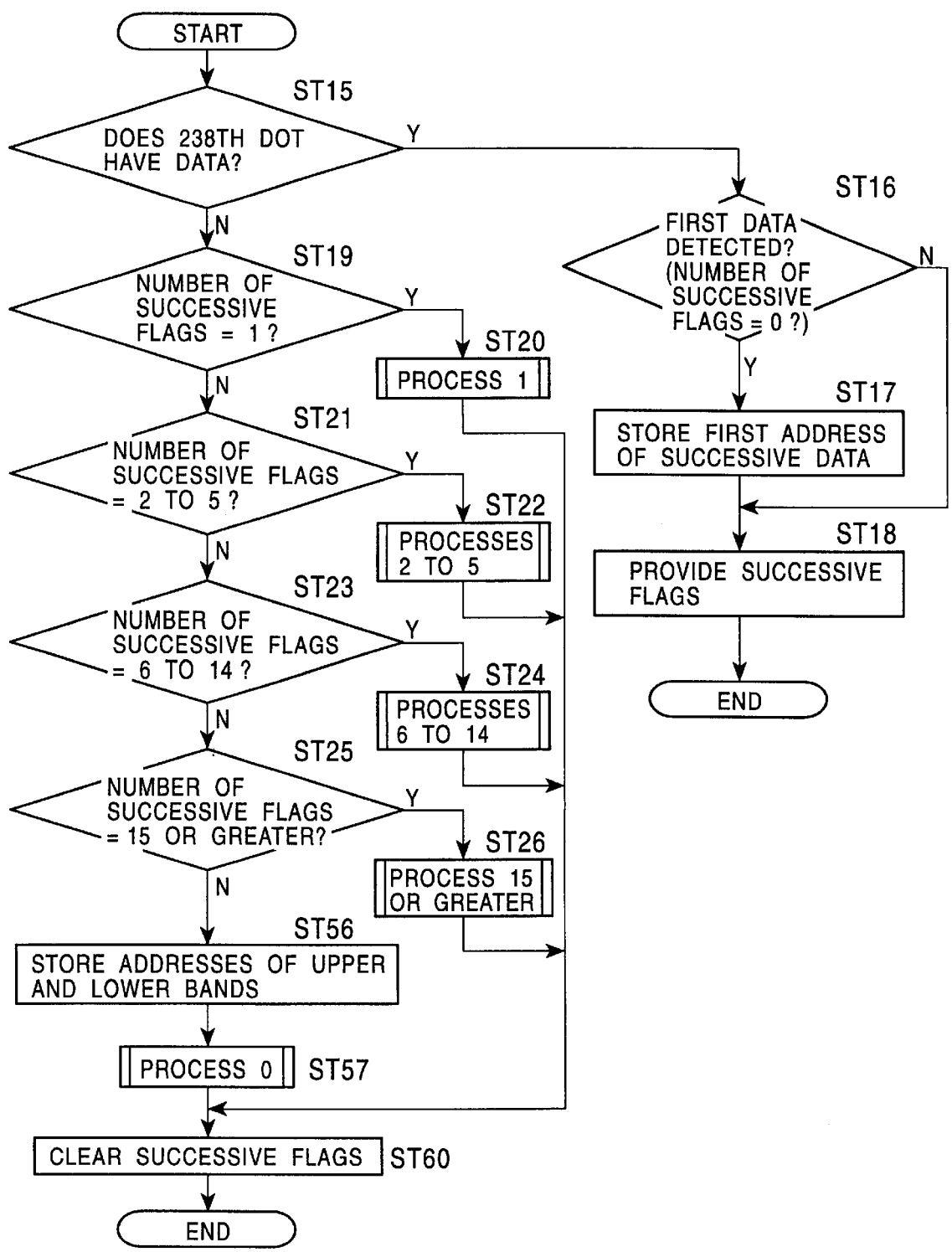
FIG. 6 is a flowchart showing the raster processing for the 238th dot shown in FIG. 2.

In step ST14, if the dots in the column are not in a solid pattern, raster processing from the 238th dot is performed. In the raster processing, as shown in FIG. 6, it is found whether the 238th dot in the column has a recording data (step ST15). If the 238th dot in the column has a recording data, it is found whether the recording data is a first recording data (step ST16). If the recording data is a first recording data, the first address of successive data corresponding to the dot is stored (step ST17), and successive flags are provided (step ST18). If the recording data is not a first recording data, successive flags are directly provided (step ST18).

If the 238th dot in the column has no recording data, the number of successive flags that have been provided is found. In accordance with the number of the successive flags, the numbers of successive flags are classified into a plurality of groups, and for the groups, recording data are assigned to the upper and lower bands. By way of example, in this embodiment, when the number of the successive flags is 1 (step ST19), process 1 is performed (step ST20). When the number of the successive flags is 2, 3, 4, or 5 (step ST21), process 2, 3, 4, or 5 is performed (step ST22). When the number of the successive flags is 6, 7, 8, 9, 10, 11, 12, 13, or 14 (step ST23), process 6, 7, 8, 9, 10, 11, 12, 13, or 14 is performed (step ST24). When the number of the successive flags is 15 or greater (step ST25), process 15 or greater is performed (step ST26). The grouping in accordance with the number of the successive flags may be performed using any number of successive flags.

Figures 9, 10:
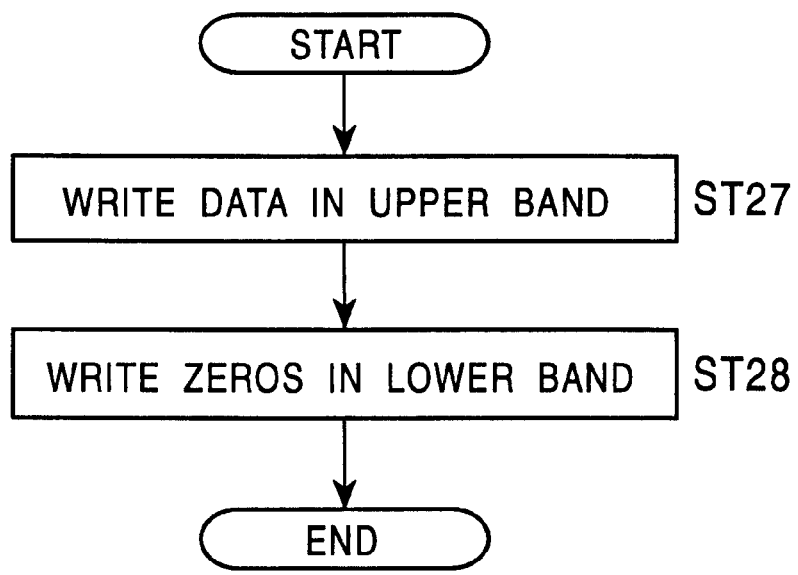
FIG. 9 is a flowchart showing process 1 shown in FIG. 6.
FIG. 10 is a drawing showing results of assignment by process 1 shown in FIG. 9.
Figure 11:
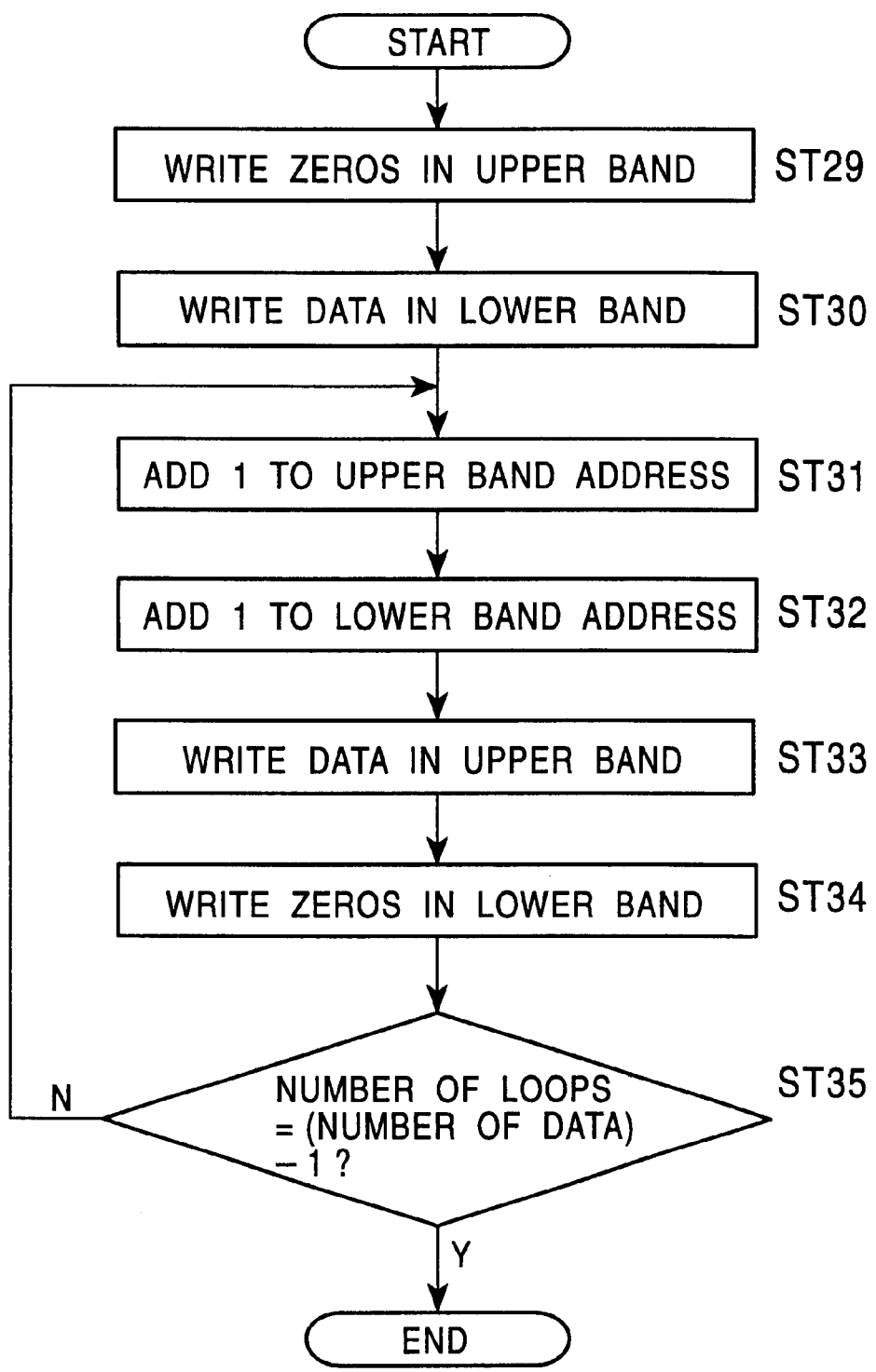
FIG. 11 is a flowchart showing each of processes 2 to 5 shown in FIG. 6.

In this embodiment, in the process 1, as shown in FIG. 9, recording data are assigned by writing the recording data of the dot in the column in the upper band (step ST27), and zero (no recording data) in the lower band (step ST28). Thereby, the recording data are assigned as shown in FIG. 10. In FIG. 10, "○" shows the existence of a recording data, and "x" shows no recording data.

In process 2, 3, 4, or 5, concerning dots having provided successive flags, zeros are written in the upper band (step ST29), as recording data for the dots of the column at the first address, and recording data are written in the lower band (step ST30). The addresses of the columns in the upper and lower bands are incremented by one (steps ST31 and ST32). The recording data of the dots in the next column are written in the upper band (step ST33), and zeros are written in the lower band (step ST34). Similarly, the addresses of the columns in the upper and lower bands are incremented by one (steps ST31 and ST32). The recording data of the dots in the column are written in the upper band (step ST33), and zeros are written in the lower band (step ST34). These steps are performed a number of times which is obtained by subtracting one from the number of the successive flags (step ST35), whereby the assignment of recording data is performed. This assigns recording data, as shown in FIG. 12.

Figure 13:
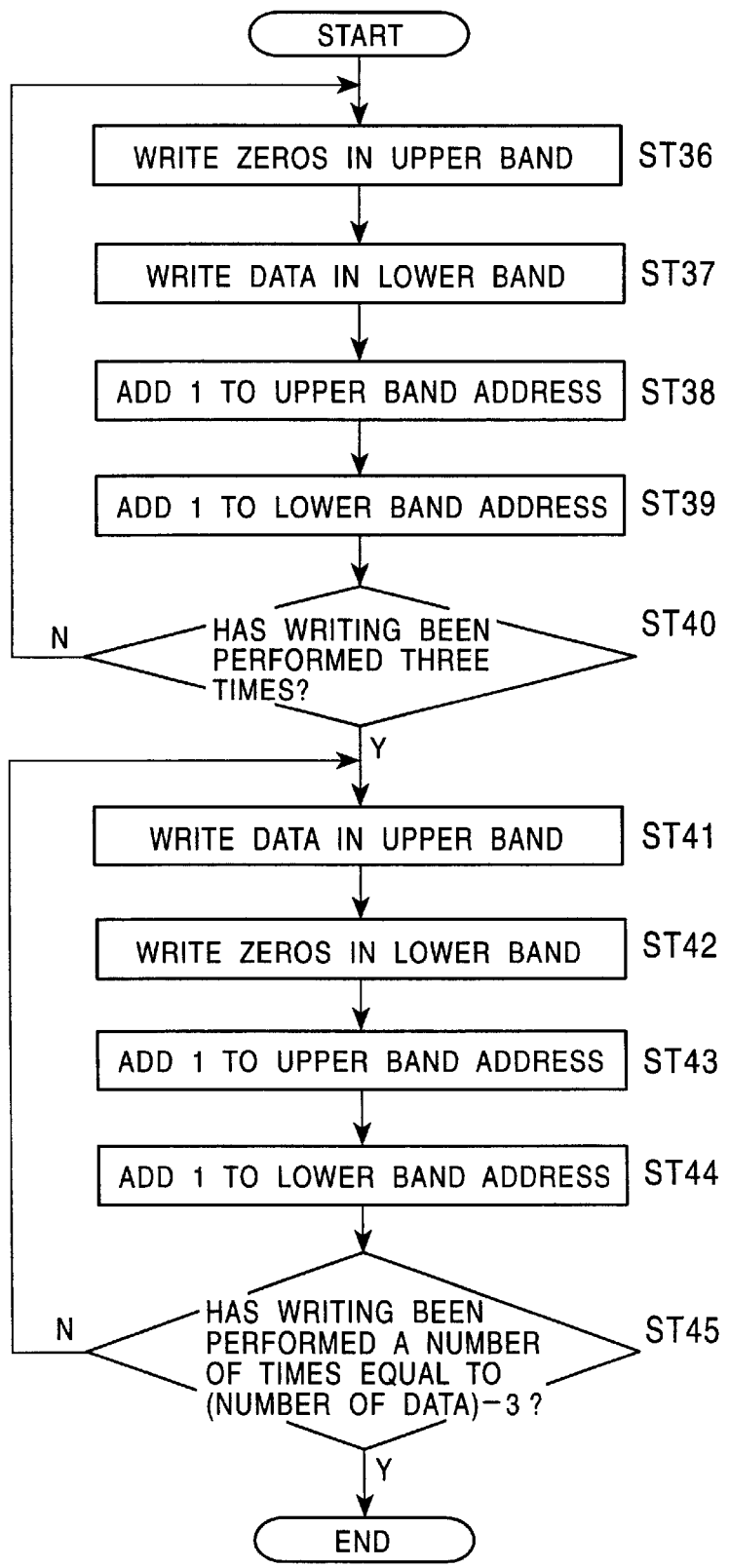
FIG. 13 is a flowchart showing each of processes 6 to 14 shown in FIG. 14.

In each of processes 6 to 14, as shown in FIG. 13, concerning the dots provided with successive flags, zeros are written in the upper band (step ST36), as recording data for the dots of the column at the first address, and recording data are written in the lower band (step ST37). The addresses of the columns in the upper and lower bands are incremented by one (steps ST38 and ST39). Similarly, zeros are written in the upper band, as the recording data of the dots in the next column (step ST36), and recording data are written in the lower band (step ST37). These steps are performed three times (step ST40). When these steps have been performed three times, the recording data of the dots in the next column are written in the upper band (step ST41), and zeros are written in the lower band (step ST42). Next, the addresses of the columns in the upper and lower bands are incremented by one (steps ST43 and ST44). Similarly, the recording data of the dots in the next column are written in the upper band (step ST41), and zeros are written in the lower band (step ST42). These steps are performed a number of times which is obtained by subtracting three from the number of the successive flags (step ST45), whereby the assignment of recording data is performed. This assigns recording data, as shown in FIG. 14.

Figure 15:
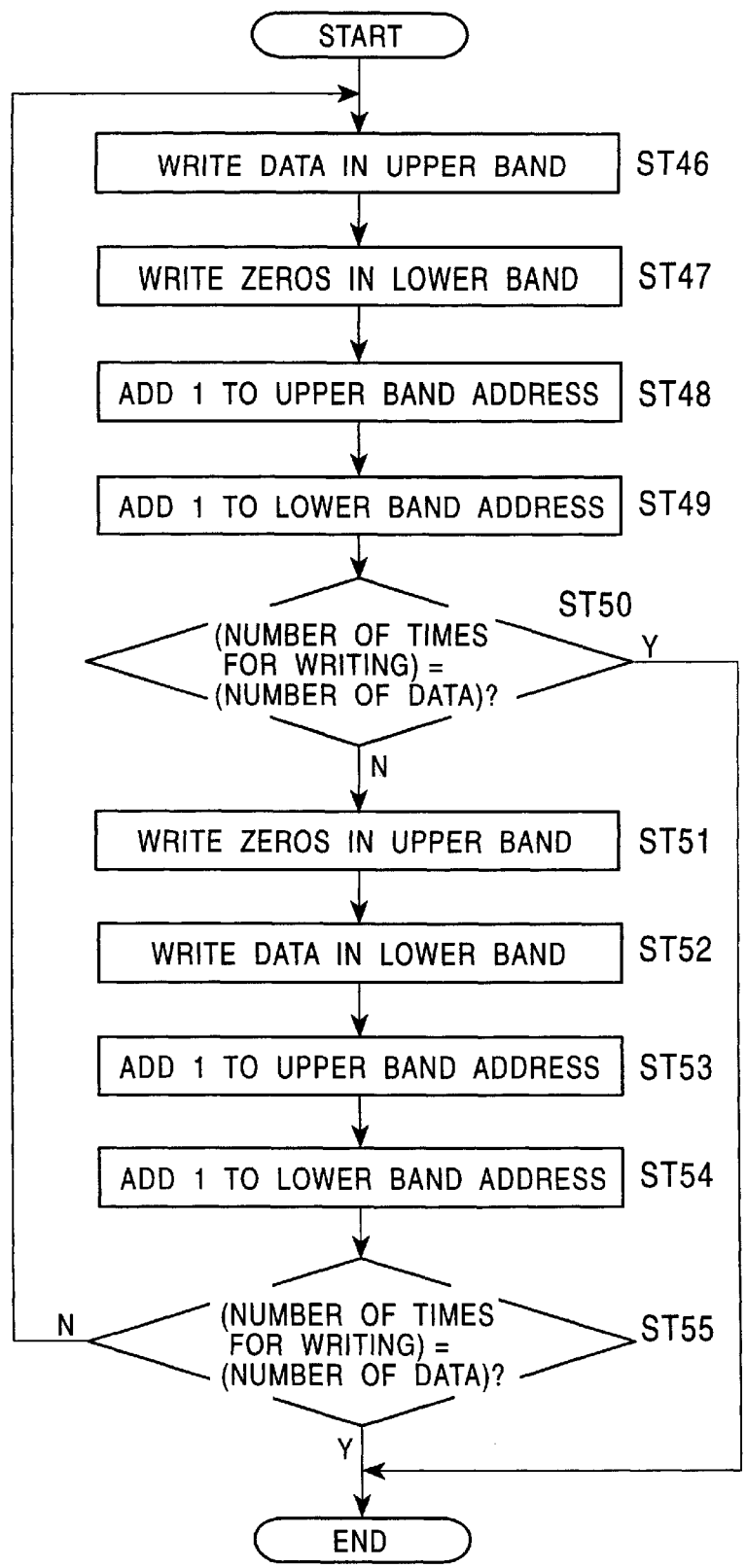
FIG. 15 is a flowchart showing process 15 or greater shown in FIG. 13.

In process 15 or greater, as shown in FIG. 15, concerning the dots having provided successive flags, the recording data of the dots in the column at the first address are written in the upper band (step ST46), and zeroes are written in the lower band (step ST47). Next, the addresses of the columns in the upper and lower bands are incremented by one (steps ST48 and ST49). In step ST50, it is determined whether the number of times for writing has reached the number of the successive flags (step ST50). If it has reached the number of the successive flags, assignment of recording data ends. If it has not reached the number of the successive flags, zeros are written in the upper band, as recording data for the dots in the next column (step ST51), and recording data are written in the lower band (step ST52). In steps ST53 and ST54, the addresses of the columns in the upper and lower bands are incremented by one. Similarly, it is determined whether the number of times for writing has reached the number of the successive flags (step ST55). If it has reached the number of the successive flags, assignment of recording data ends. If it has not reached the number of the successive flags, these steps are performed a number of times which is equal to the number of the successive flags, whereby the assignment of recording data is performed. This assigns recording data, as shown in FIG. 16.

Figures 7, 8:
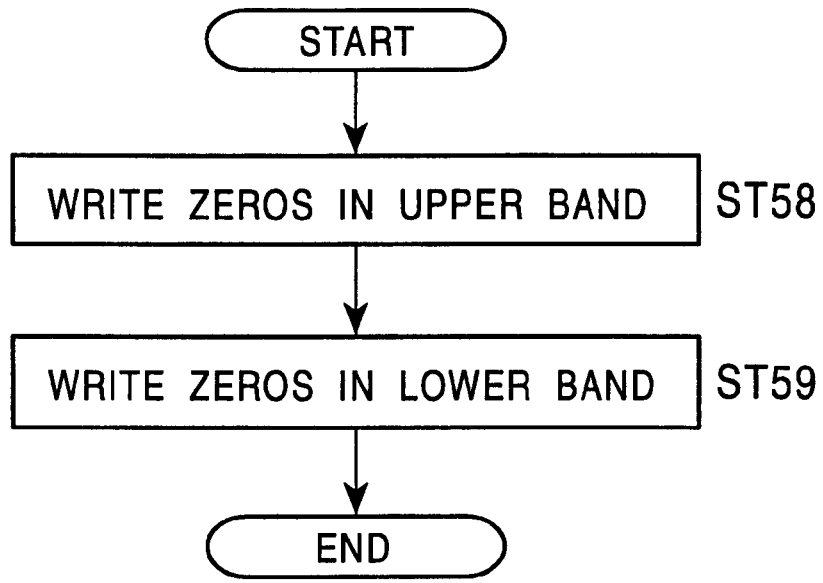
FIG. 8 is a drawing showing results of assignment by process 0 shown in FIG. 6.

In addition, as shown in FIG. 6, in the case where the dots in the column have no recording data, and the number of the successive flags is not 1, 2, 3, 4, 5, 6, 7, 8, 9, 10, 11, 12, 13, 14, 15 or greater, in other words, the number of the successive flags is zero, the addresses of the columns in the upper and lower bands are stored (step ST56), and process 0 is performed (step ST57). In process 0, as shown in FIG. 7, zero are written in the upper band, as the recording data of the dots in the column (step ST58), and zeros are written in the lower band (step ST59). This assigns recording data, as shown in FIG. 8.

At the completion of the above-described steps, the successive flags are cleared (step ST60), and the raster processing for the 238th dot is complete.

As described above, after the assignment of recording data in the 238th dot, raster processing for the 239th dot is performed (step ST61), and raster processing for the 240th dot is performed (step ST62).

Subsequently, the address is shifted for the next column (step ST63), and it is determined whether recording data assignment for all the columns has been performed (step ST64). If it has been performed, the assignment of recording data is complete. If it has not been performed, recording data assignment for all the columns is repeatedly performed.

The above-described embodiment describes the assignment of the recording data of the 238th dot. However, assignment of recording data is not limited to that in the above-described embodiment. In the present invention, recording data are arbitrarily assigned to the upper and lower bands in accordance with image information, etc. Also the assignment of the recording data of the 239th and 240th dots may be arbitrarily performed.

By causing the thermal head to operate based on the recording data assigned using the above-described processes, the desired recording is performed.

By assigning, based on information of, e.g., cyan, magenta, and yellow images, the recording data for a plurality of colors, the appropriate recording of full color images can be performed. The assignment of each color may be performed by the same technique or by a different technique for each color. Also, by assigning, based on monochrome image information, recording data, the appropriate recording of monochrome images can be performed.

In the case where recording data are written in an upper band and a lower band for one dot, the generated record may be thick because a record formed by the upper band of the thermal head overlaps with a record formed by the lower band of the thermal head. In this case, at least either the record formed by the upper band or the record formed by the lower band may be set to have less gradations.

Accordingly, in this embodiment, in the case where dots in the raster direction have recording data, successive flags are provided to the dots, and only when the dots have no recording data, the recording data in the dots provided with the successive flags are assigned to the upper and lower bands. Therefore, compared with a conventional technique in which recording data are assigned for each column, the assignment of the recording data is simplified, which greatly reduces the amount of processing, and which enables facile and rapid processing. Thereby, the assignment time is approximately ½, compared with that in the conventional technique. Thus, a high recording speed is realized, and by changing the diameter of each dot, the image recording method of the present invention can cope with even a case requiring multigradation recording.

Next, concerning a means for assigning the dots in the overlapping area to the upper and lower bands, a second embodiment of the present invention is described below with reference to FIGS. 17 to 29.

Figure 17:
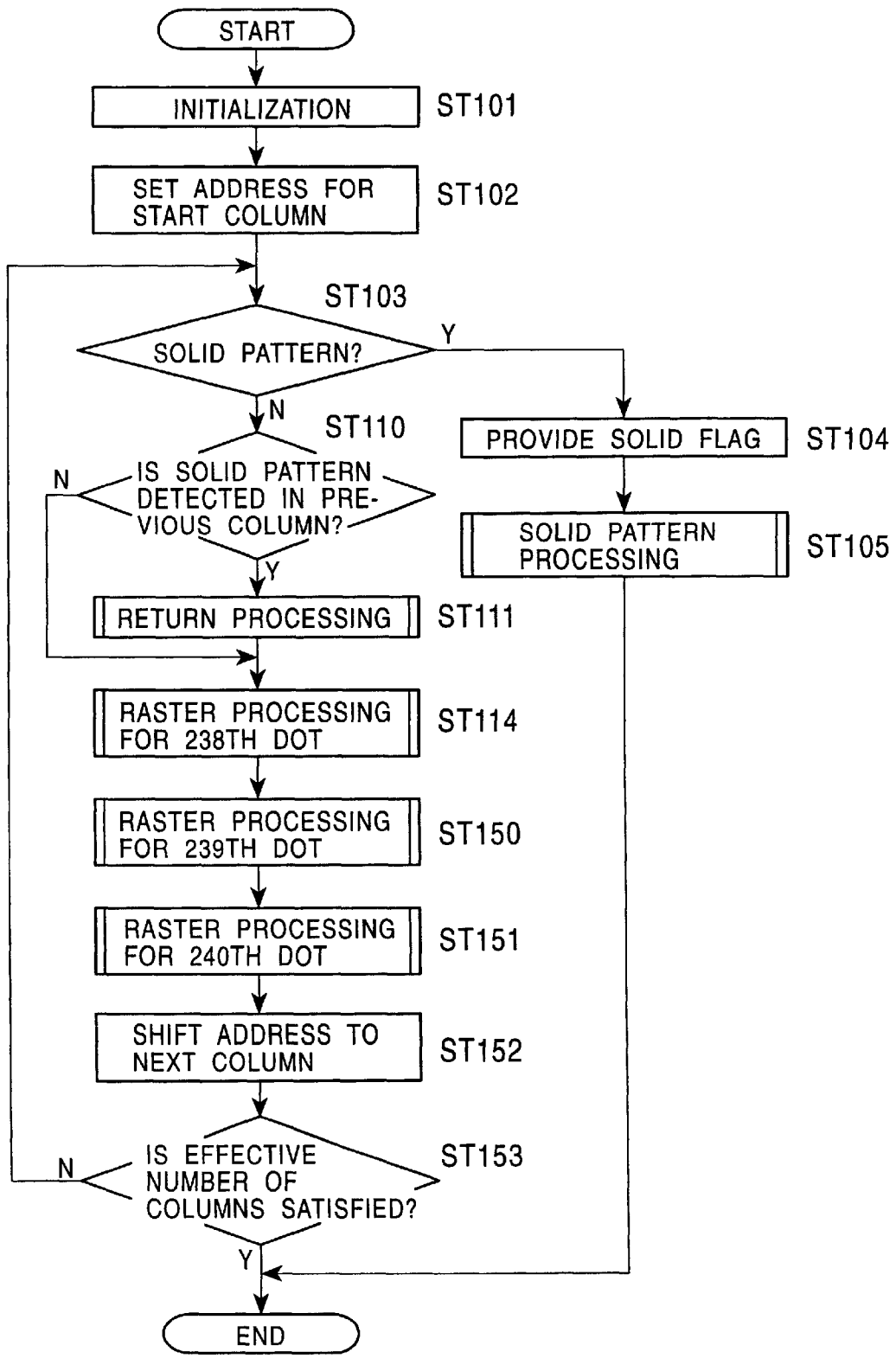
FIG. 17 is a flowchart showing the assignment of recording data in an image recording method of the present invention.

As shown in FIG. 17, initially, a memory for storing the recording data, and a control circuit are initialized (step ST101), and an address is set for a dot in an outermost (start) column (in the overlapping area) in which recording is performed (step ST102).

It is determined whether the dots of the start column are in a solid pattern (step ST103). The solid pattern is a pattern that should be recorded at a maximum gradation. In the case where all dots in the column direction are solid, it is determined that the dots are in a solid pattern.

Figure 18:
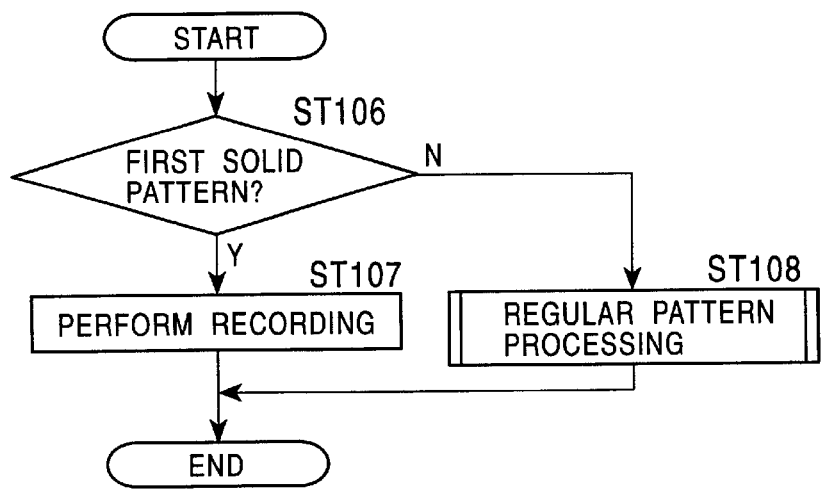
FIG. 18 is a flowchart showing the solid-pattern processing shown in FIG. 17.
Figure 20:
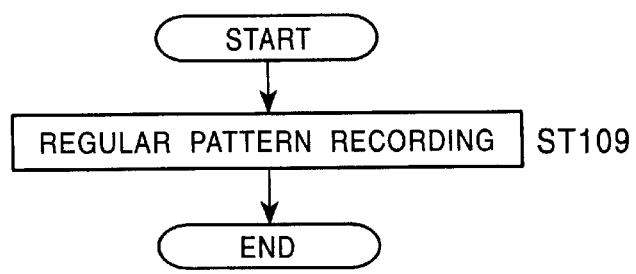
FIG. 20 is a flowchart showing the regular pattern processing shown FIG. 18.

If the dots of the columns are in a solid pattern, a solid flag is provided (step ST104), and solid pattern processing is performed (step ST105). In the solid pattern processing, it is determined whether the detected solid pattern is a first solid pattern (step ST106), as shown in FIG. 18. If the detected solid pattern is a first solid pattern, the dots in the column direction are assigned to, e.g., the upper band, as dots in which recording is performed at a maximum gradation (step ST107). Obviously, the dots in the column direction may be assigned to the lower band. If the detected solid pattern is not a first pattern, regular pattern processing is performed (step ST108). In the regular pattern processing, some dots are subtracted from, for example, the dots in the column direction, and only the dots in which recording is performed are assigned to, e.g., the upper band, as dots in which recording is performed at a maximum gradation (step ST109), as shown in FIG. 20.

Figure 19:
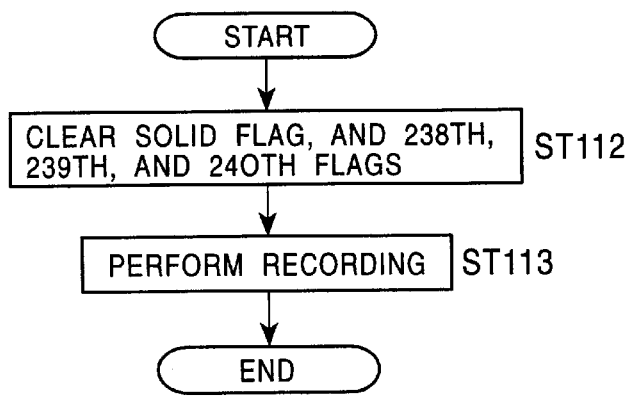
FIG. 19 is a flowchart showing the return processing shown in FIG. 17.

As shown in FIG. 17, the dots of the column are not in a solid pattern, it is determined whether the dots of the previous column are in a solid pattern (step ST110). If the dots of the previous column are in a solid pattern, return processing is performed (step ST111). In the return processing, solid flags are cleared (step ST111), and the dots of the previous column are assigned to, e.g., the upper band, as dots in which recording is performed at a maximum gradation (step ST113), as shown in FIG. 19. In other words, a recording area using a solid pattern is set up such that in the first and last columns for the solid pattern, recording by all the dots is performed, and that in intermediate columns between them, recording by the subtracted columns is performed. Recording by all the dots in the first and last columns for the solid pattern is performed in order that in a pattern such as a solid pattern rectangle, stitched part of a side may not be lost. The reason that recording by the subtracted dots in the intermediate columns is performed is that if recording by all the dots in the intermediate columns is performed, a a recording is so thick that a so-called "black line" is generated.

Figure 21:
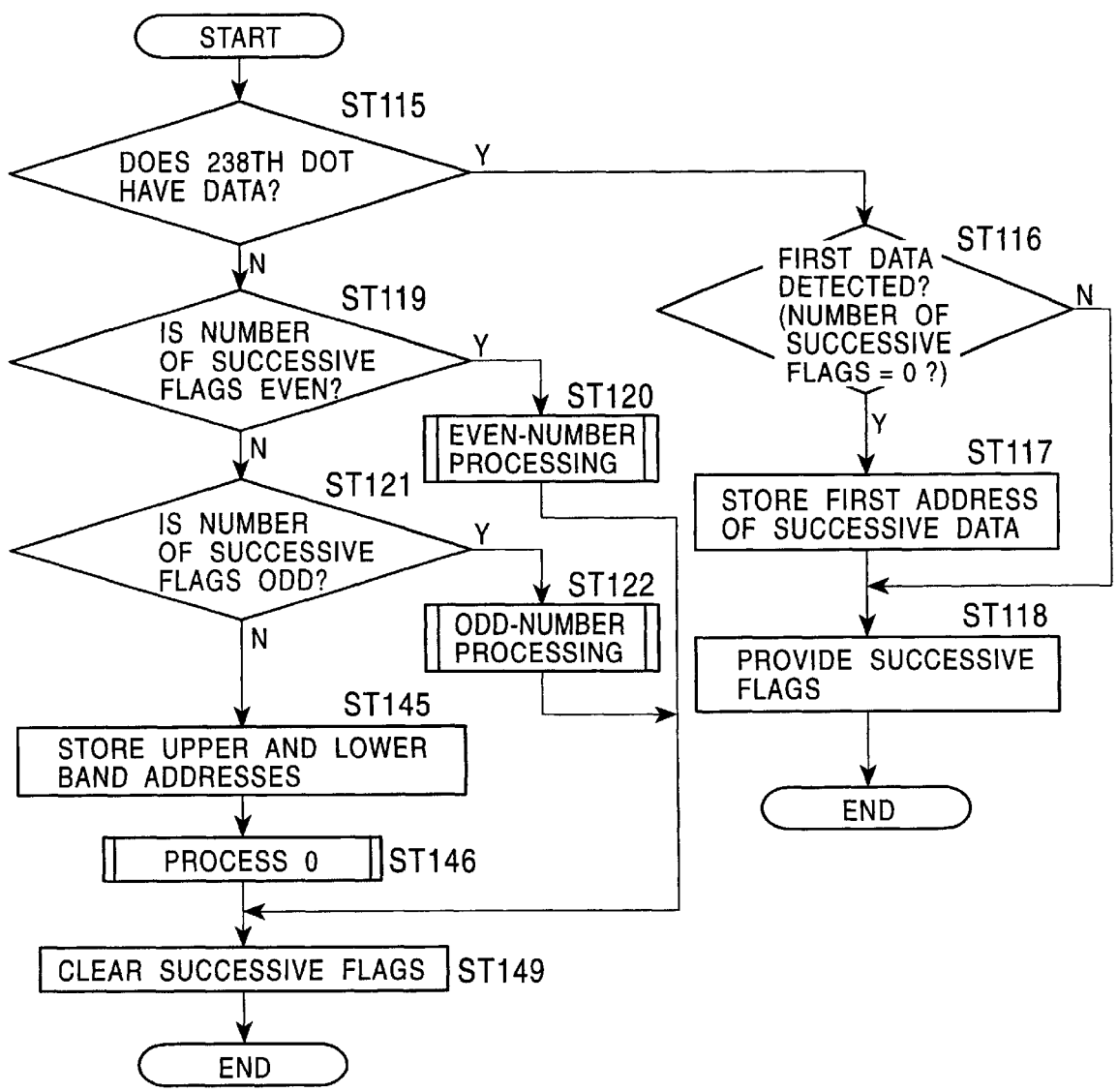
FIG. 21 a flowchart showing the raster processing for the 238th dot shown in FIG. 17.

In step ST114, if the dots in the column are not in a solid pattern, raster processing from the 238th dot is performed. In the raster processing, as shown in FIG. 21, it is found whether the 238th dot in the column has a recording data (step ST115). If the 238th dot in the column has a recording data, it is found whether the recording data is a first recording data (step ST116). If the recording data is a first recording data, the first address of successive data corresponding to the dot is stored (step ST117), and successive flags are provided (step ST118). If the recording data is not a first recording data, successive flags are directly provided (step ST118).

If the 238th dot has no recording data, the number of successive flags that have been provided is found. Based on the number of the successive flags, the recording data are divided in the center of the raster direction into two groups, and the two groups of recording data are assigned to the upper and lower bands. At this time, in the second embodiment, it is determined whether the number of successive flags is even (step ST119). If the number of successive flags is even, even-number processing is performed (step ST120). If the number of successive flags is not even, it is determined whether the number of successive flags is odd (step ST121). If the number of successive flags is odd, odd-number processing is performed (step ST122).

For recording the two groups of recording data in the raster direction, the upper band or the lower band may be arbitrarily selected. However, in the second embodiment, in the case where a so-called "screen angle" is formed by appropriately shifting basic dots (basic cells) in units of the coordinates of a dithering matrix, the selection of the upper band or the lower band is determined based on the polarity of the screen angle.

By way of example, in the case where the screen angle is negative, among the two separate groups of recording data, the left group of recording data is assigned to the lower band, and the right group of recording data is assigned to the upper band. When the screen angle is positive, the left group of recording data is assigned to the upper band, and the right group of recording data is assigned to the lower band.

The reason that the screen angle is set to be negative or positive is to prevent moire from occurring when recording is performed by using colors of ink to overlap, or to stabilize the hues of a recorded image.

Here, the even-number processing and the odd-number processing are described below by using the case where recording is performed so that the screen angle is negative.

Figure 22:
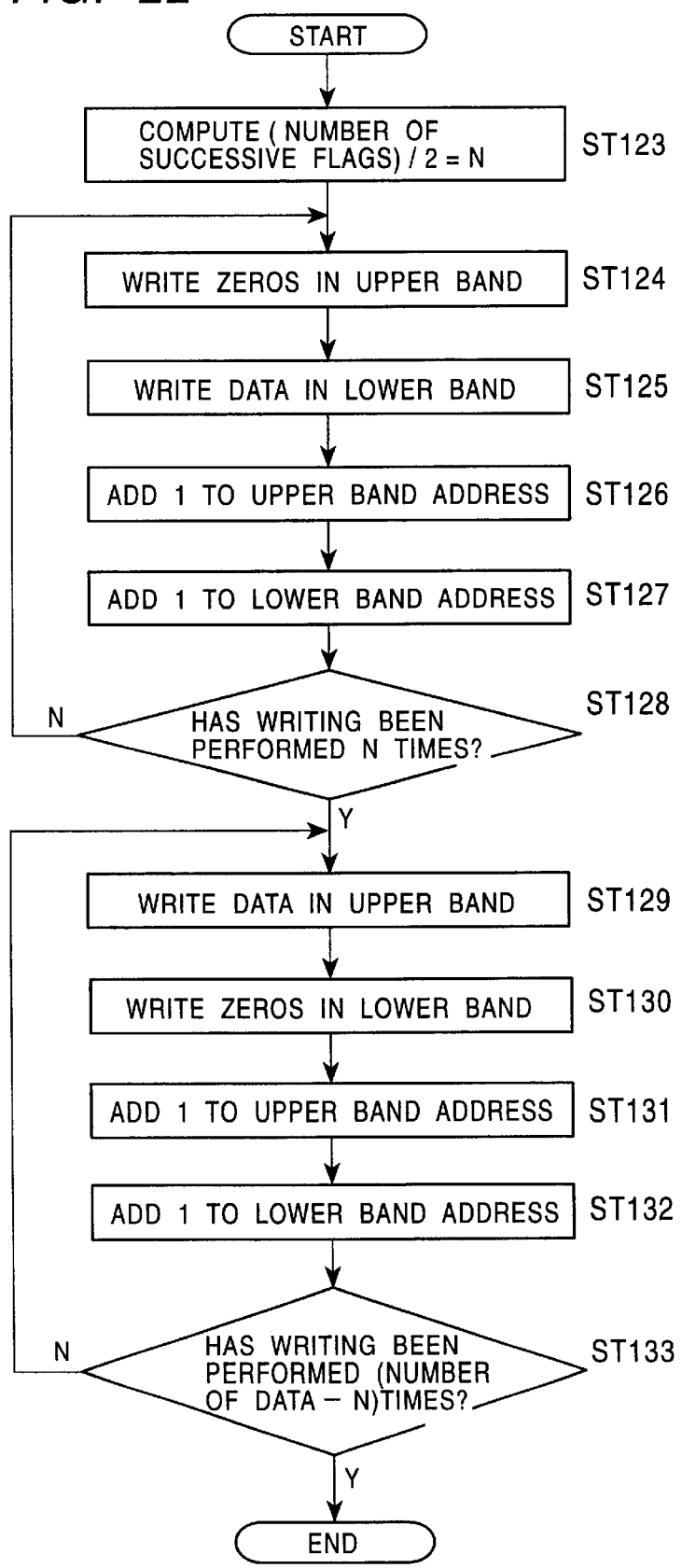
FIG. 22 is a flowchart showing processing at a negative screen angle in the even-number processing shown in FIG. 21.
Figure 26:
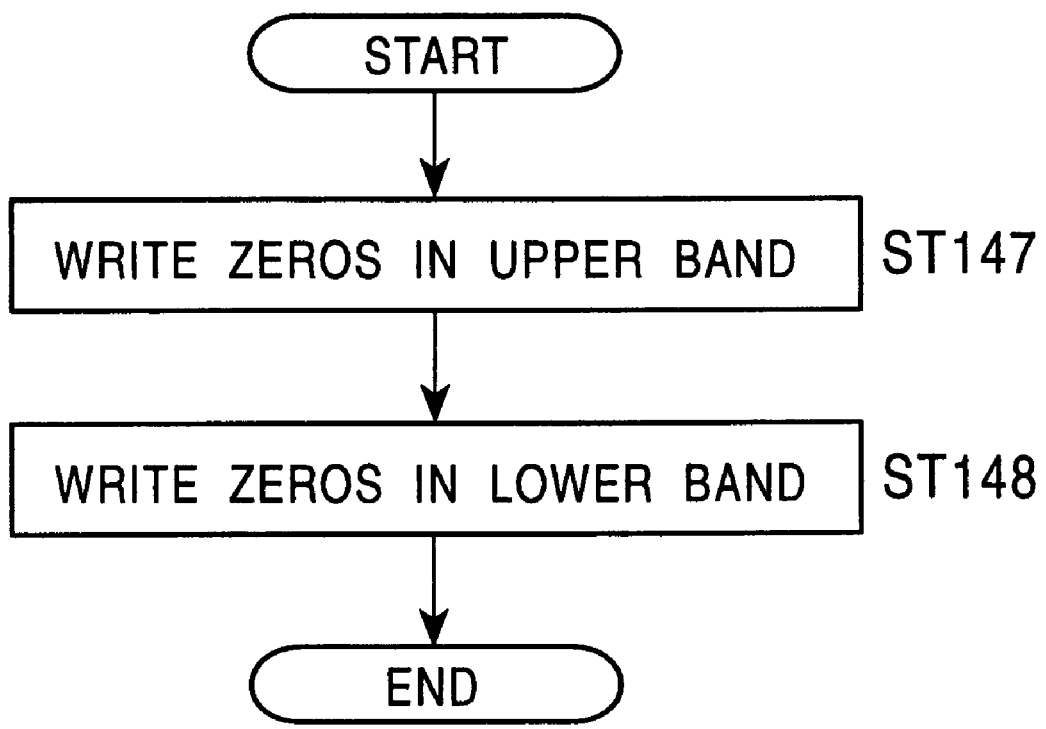
FIG. 26 is a flowchart showing process 0 shown in FIG. 21.

The even-number processing is performed as shown in FIG. 22. Initially, value N is computed by dividing the number of successive flags by 2 (step ST123). Zeros are written in the upper band, as the recording data in the dots of the column having the first address, among the dots provided with the successive flags (step ST124), and the recording data are written in the lower band (step ST125). Next, The addresses of the columns in the upper and lower bands are incremented by one (steps ST126 and ST127). Similarly, in the dots in the next column, zeros (as recording data) are written (step ST124), and the recording data are written in the lower band (step ST125). These steps are performed N times (step ST128). When these steps have been performed N times, the recording data in the dots in the next column are written in the upper band (step ST129), and zeros are written in the lower band (step ST130). Next, The addresses of the columns in the upper and lower bands are incremented by one (steps ST131 and ST132). Similarly, the recording data in the dots in the next column are written in the upper band (step ST129), and zeros are written in the lower band (step ST130). These steps are performed (the number of data–N) times (step ST133), whereby the assignment of the recording data is performed. This assigns the recording data, as shown in FIG. 23. In FIG. 23, "○" shows the existence of a recording data, and "x" shows no recording data.

Next, the odd-number processing is described below with reference to FIGS. 24 and 25.

In the case where the number of successive flags is odd, the successive flags cannot be divided in the raster direction into equal numbers of right and left groups, and some successive flags remain. Accordingly, by adding the remaining successive flags to either the right or left group, each recording data is written in either upper or lower band.

In the second embodiment, in the rasterization for the 238th dot, the assignment is performed so that a remaining one dot is added to the left group. In other words, as shown in FIG. 24, value M is computed by dividing (the number of successive flags–1) by 2 (step ST134). Zeros are written in the upper band, as the recording data in the dots of the column having the first address, among the dots provided with the successive flags (step ST135), and the recording data are written in the lower band (step ST136). The addresses of the columns in the upper and lower bands are incremented by one (steps ST137 and ST138). Similarly, in the dots in the next column, zeros (as recording data) are written (step ST135), and the recording data are written in the lower band (step ST136). These steps are performed N times (step ST139). When these steps have been performed N times, the recording data in the dots in the next column are written in the upper band (step ST140), and zeros are written in the lower band (step ST141). The addresses of the columns in the upper and lower bands are incremented by one (steps ST142 and ST143). Similarly, the recording data in the dots in the next column are written in the upper band (step ST140), and zeros are written in the lower band (step ST141). These steps are performed (the number of recording data–M) times (step ST144), whereby the assignment of the recording data is performed. This assigns the recording data, as shown in FIG. 25.

It may be arbitrarily determined whether the one dot of the remaining flag in the odd-number processing is added to the right group or the left group. In the second embodiment, the columns corresponding to the 238th and 239th dots are added to the left group, and the column corresponding to the 240th column is added to the right group.

In the case where the dots of a column have no recording data, and the number of successive flags is zero, the addresses of the column in the upper and lower bands are stored (step ST145), and process 0 is performed (step ST146), as shown in FIG. 21. In process 0, zeros are written in the upper band, as recording data in the dots of the column (step ST147), and zeros are written in the lower band (step ST148). This assigns the recording data, as shown in FIG. 27.

When each of the above-described processing is completed, the successive flags are cleared (step ST149) to complete rasterization for the 238th dot.

After the assignment of the recording data in the 238th dot as described above, rasterization for the 239th dot is performed (step ST150), and rasterization for the 240th dot is performed (step ST151), as shown in FIG. 17.

Subsequently, the address is shifted for the next column (step ST152), and it is determined whether the assignment of the recording data in all the columns has been performed (step ST153). If the assignment of the recording data in all the columns has been performed, the assignment is completed. If the assignment of the recording data in all the columns has not been performed yet, the assignment of the recording data is repeatedly performed for all the columns.

By operating the thermal head, based on the assigned recording data, the desired recording is performed.

The second embodiment describes the assignment of the recording data in the case where the screen angle is negative. However, in the case where recording is performed so that the screen angle is positive, the recording data assigned to the upper and lower bands are conversely assigned.

Specifically, in the even-number processing and the odd-number processing, the recording data written in the upper band when the screen angle is negative are written in the lower band, and zeros (no recording data) are written in the upper band. In addition, the recording data written in the lower band are written in the upper band, and zeros are written in the lower band. Thereby, the recording data are assigned as shown in FIGS. 28 and 29.

By assigning, based on information of, e.g., cyan, magenta, and yellow images, the recording data for a plurality of colors, the appropriate recording of full color images can be performed. Concerning the assignment of each color, recording data may be assigned based on the same even-number and the same odd-number processing for each color, and recording data may be assigned so that even-number processing and odd-number processing differ in accordance with each color.

Also, by assigning, based on monochrome image information, recording data, the appropriate recording of monochrome images can be performed.

In the second embodiment, when the dots in the raster direction have recording data, successive flags are provided to the dots, and only when the dots in the raster direction have no recording data, the successive dots provided with the successive flags are divided into two groups, namely, right and left groups, and the recording data in the successive dots are regularly assigned to the upper and lower bands. Therefore, compared with a conventional case where the assignment of recording data for each column is performed, the assignment of the recording data is simplified, which greatly reduces the amount of processing, and which enables facile and rapid processing. Thereby, the assignment time is extremely reduced, compared with that in the conventional technique. Thus, a high recording speed is realized, and by changing the diameter of each dot, the image recording method of the present invention can cope with even a case requiring multigradation recording.

Figure 30:
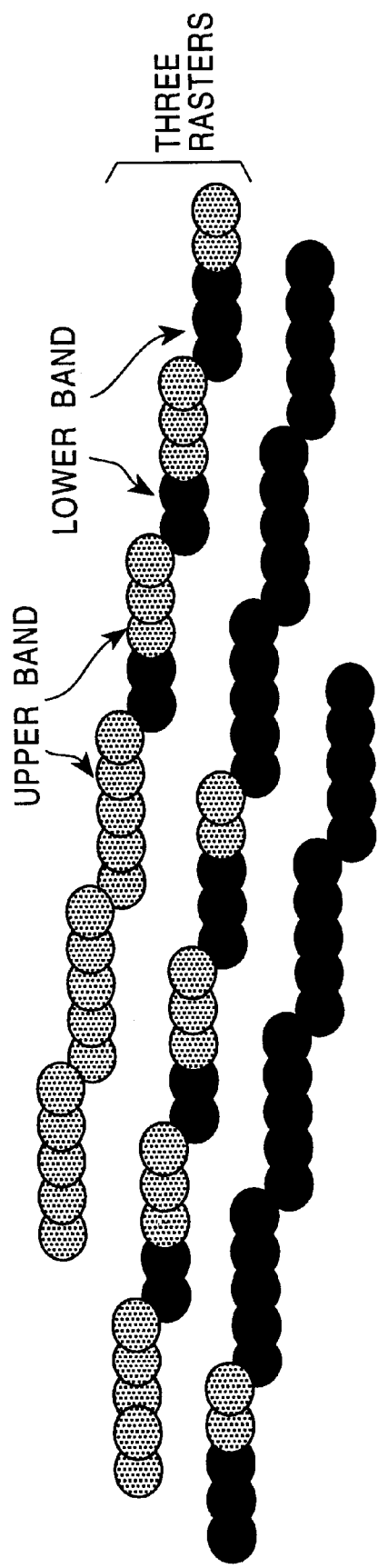
FIG. 30 is a drawing showing an overlapping recording area formed by an upper band and a lower band when a paper feeding pitch is appropriate in an image recording method of the present invention.
Figure 31:
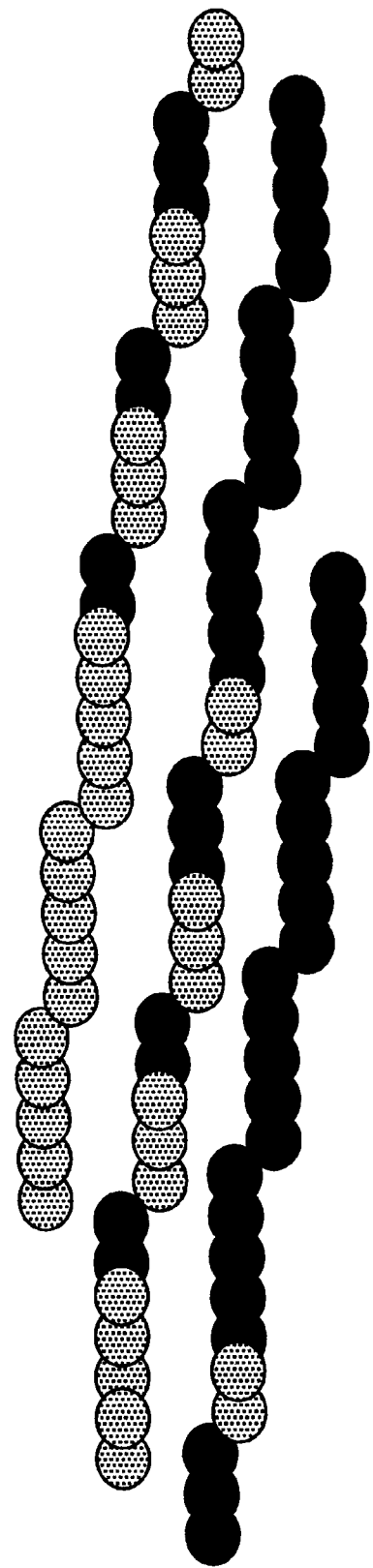
FIG. 31 is a drawing showing an overlapping recording area formed by an upper band and a lower band when a paper feeding pitch is narrow in an image recording method of the present invention.

In addition, as shown in FIG. 30, the successive dots provided with the successive flags are divided into two groups, namely, right and left groups, and the recording data in the successive dots are assigned to the upper and lower bands in a fixed form. Thus, as shown in FIG. 31, in the case where the screen angle is negative, even if the paper feeding pitch narrows, the distance between dots based on the recording data assigned to the lower band is maintained to be appropriate, which prevents a small distance between dots from appearing, and which prevents black lines from appearing.

Figure 32:
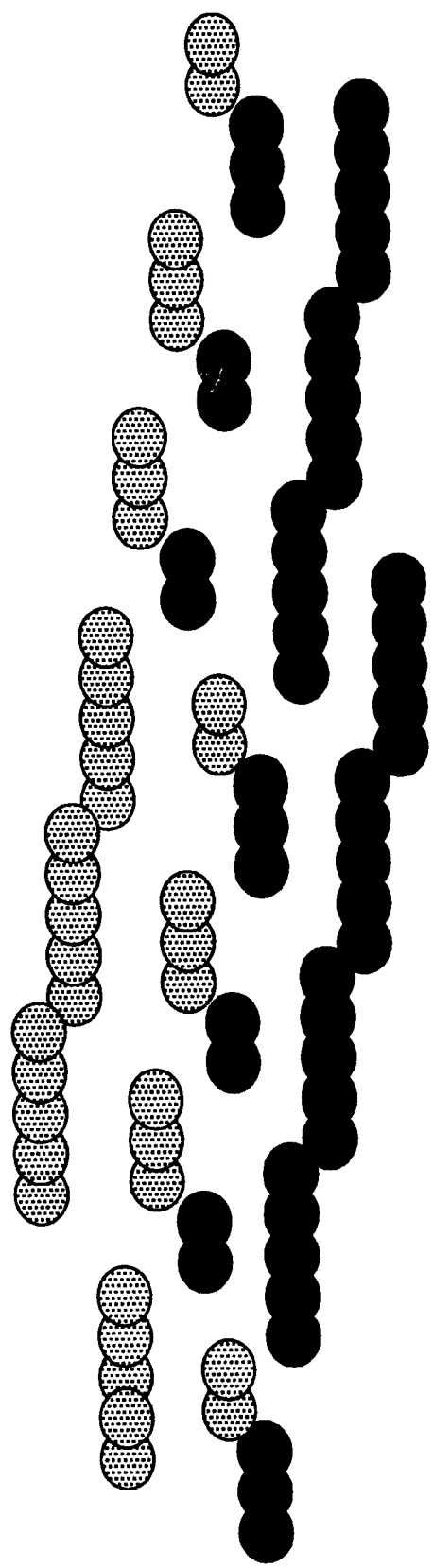
FIG. 32 is a drawing showing an overlapping recording area formed by an upper band and a lower band when a paper feeding pitch is wide in an image recording method of the present invention.

Conversely, if the paper feeding pitch increases as shown in FIG. 32, the distance between dots based on the recording data assigned to the upper band is maintained to be appropriate, which prevents a large distance between dots from appearing, and which prevents white lines from occurring.

Moreover, efficient clear recording using preferable connection of dots can be performed such that when recording is performed so that the screen angle is negative, among the recording data in the dots provided with the successive flags divided into the right and left groups, the left recording data are written in the lower band, and the right recording data are written in the upper band, and when the screen angle is positive, among the recording data in the dots provided with the successive flags divided into the right and left groups, the left recording data are written in the upper band, and the right recording data are written in the lower band.

Next, concerning a means for assigning the dots in the overlapping area to the upper and lower bands, a third embodiment of the present invention is described below with reference to FIGS. 33 and 34.

Figure 33:
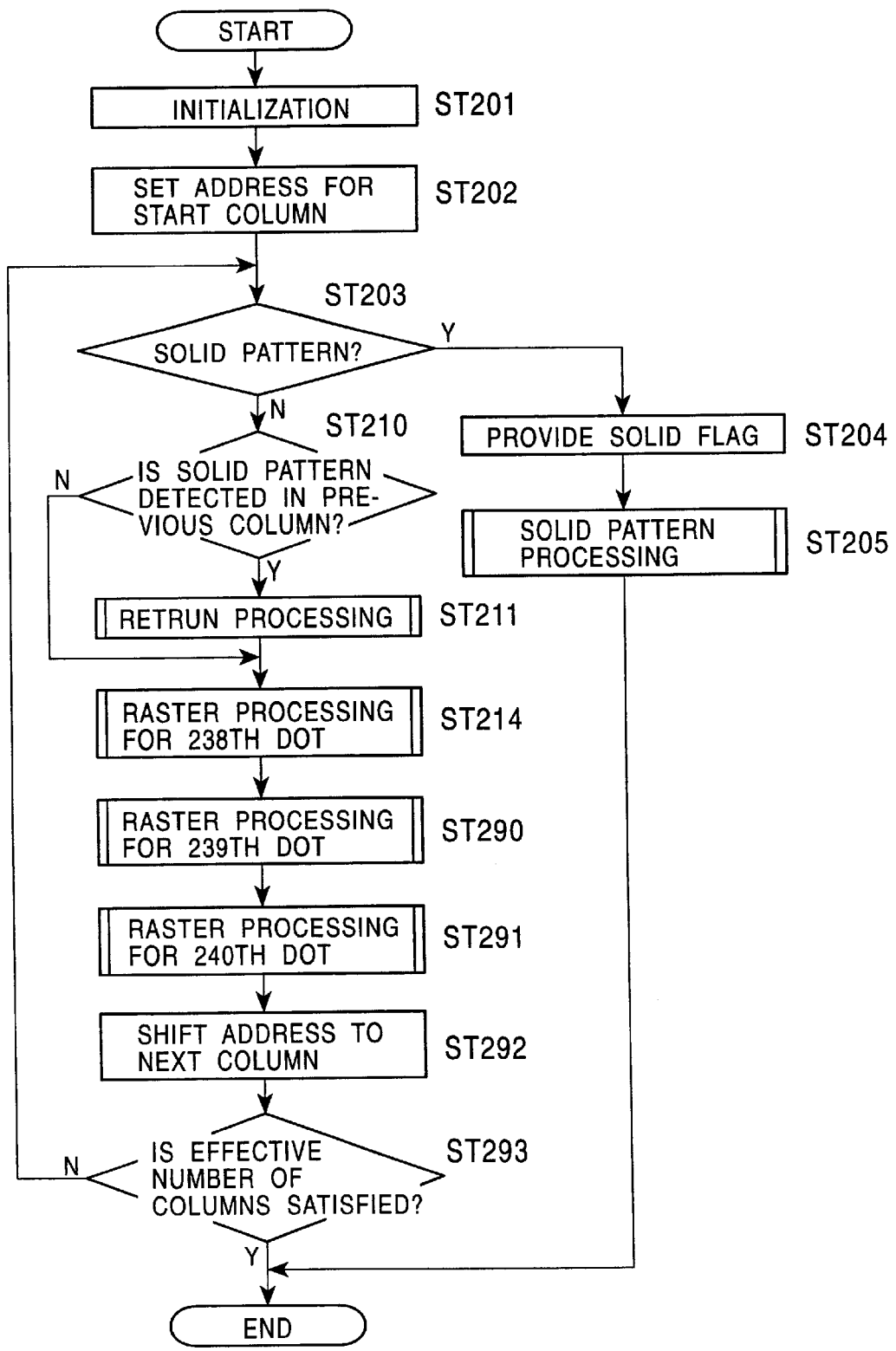
FIG. 33 is a flowchart showing the assignment of recording data in an image recording method of the present invention.
Figure 34:
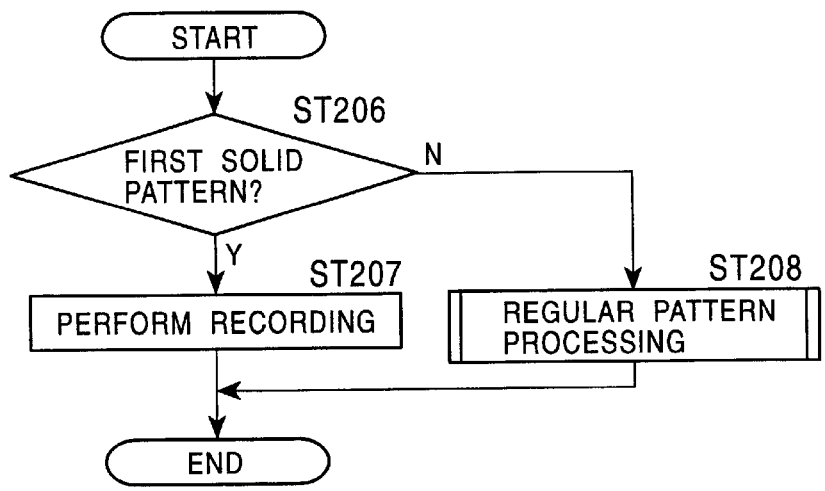
FIG. 34 is a flowchart showing the solid-pattern processing shown in FIG. 33.

Referring to FIG. 33, initially, a memory for storing the recording data, and a control circuit are initialized (step ST201), and an address is set for a dot in an outermost (start) column (in the overlapping area) in which recording is performed (step ST202).

It is determined whether the dots of the start column are in a solid pattern (step ST203). The solid pattern is a pattern that should be recorded at a maximum gradation. In the case where all dots in the column direction are solid, it is determined that the dots are in a solid pattern.

Figure 36:
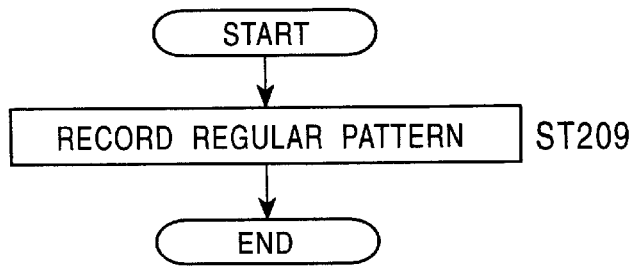
FIG. 36 is a flowchart showing the regular pattern processing shown in FIG. 35.
Figure 37:
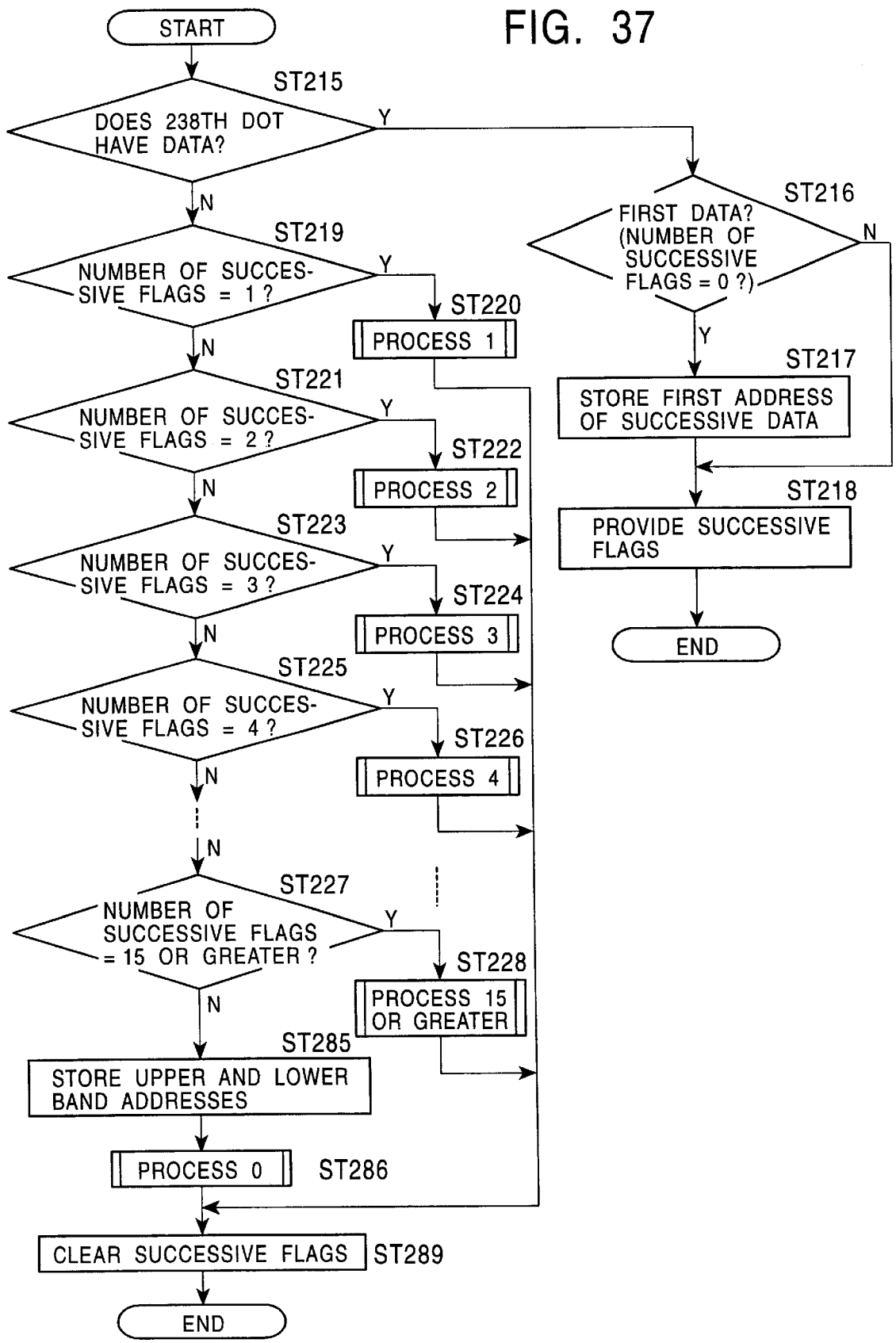
FIG. 37 is a flowchart showing the raster processing for the 238th dot shown in FIG. 33.

If the dots of the columns are in a solid pattern, a solid flag is provided (step ST204), and solid pattern processing is performed (step ST205). In the solid pattern processing, it is determined whether the detected solid pattern is a first solid pattern (step ST206) as shown in FIG. 34. If the detected solid pattern is a first solid pattern, the dots in the column direction are assigned to, e.g., the upper band, as dots in which recording is performed at a maximum gradation (step ST207). Obviously, the dots in the column direction may be assigned to the lower band. If the detected solid pattern is not a first pattern, regular pattern processing is performed (step ST208). In the regular pattern processing, some dots are subtracted from, for example, the dots in the column direction, and only the dots in which recording is performed are assigned to, e.g., the upper band, as dots in which recording is performed at a maximum gradation (step ST209), as shown in FIG. 36.

Figure 35:
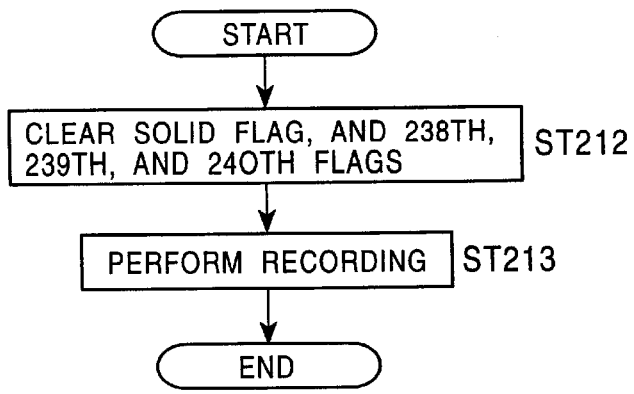
FIG. 35 is a flowchart showing the return processing shown in FIG. 33.

As shown in FIG. 33, the dots of the column are not in a solid pattern, it is determined whether the dots of the previous column are in a solid pattern (step ST210). If the dots of the previous column are in a solid pattern, return processing is performed (step ST211). In the return processing, solid flags are cleared (step ST211), and the dots of the previous column are assigned to, e.g., the upper band, as dots in which recording is performed at a maximum gradation (step ST213), as shown in FIG. 35. In other words, a recording area using a solid pattern is set up such that in the first and last columns for the solid pattern, recording by all the dots is performed, and that in intermediate columns between them, recording by the subtracted columns is performed. Recording by all the dots in the first and last columns for the solid pattern is performed in order that in a pattern such as a solid pattern rectangle, stitched part of a side may not be lost. The reason that recording by the subtracted dots in the intermediate columns is performed is that if recording by all the dots in the intermediate columns is performed, a recording is so thick that a so-called "black line" is generated.

In step ST214, if the dots in the column are not in a solid pattern, raster processing from the 238th dot is performed. In the raster processing, as shown in FIG. 6, it is found whether the 238th dot in the column has a recording data (step ST215). If the 238th dot in the column has a recording data, it is found whether the recording data is a first recording data (step ST216). If the recording data is a first recording data, the first address of successive data corresponding to the dot is stored (step ST217), and successive flags are provided (step ST218). If the recording data is not a first recording data, successive flags are directly provided (step ST218).

If the 238th dot in the column has no recording data, the number of successive flags that have been provided is found. In accordance with the number of successive flags, the assignment of recording data is performed by an arbitrary process such as process 1 (step ST220), process 2 (step ST221), or process 3 (step ST224).

In the third embodiment, when the number of successive flags is 15 or greater (step ST227), the recording data as a group are assigned (step ST228). The assignment of the recording data is not limited to this technique, but the assignment of the recording data may be set to be performed for cases where the number of successive flags is not less than 15. Conversely, the assignment of the recording data is not performed for cases where the number of successive flags is not more than 15, but the simultaneous assignment of the recording data may be performed classifying the numbers of successive flags.

The assignment of the successive flags is specifically described as follows:

The number of successive flags is found. In accordance with the number of successive flags, from among the recording data in the dots provided with the successive flags, at least the recording data in one predetermined dot is extracted, and the extracted recording data is added to other dots (in the raster direction) having no recording data. At the same time, the recording data are assigned to the upper and lower bands. At this time, determination of which dot the recording data should be extracted from, and which dot the recording data should be added to, may be arbitrarily performed so that black lines and white lines hardly appear. The determination is performed with reference to dot concentration caused by the number of gradations, difference in recording paper, etc., and recording reproducibility such as a shape and an outline. Finally, when all parameters related to recording conditions are determined, and the present invention is embodied as a product such as a heat transfer printer, a technique for assigning the recording data is completely determined depending on the classification of processing in accordance with each number of successive flags. In the third embodiment, the recording data in the right dots provided with the successive flags are shifted to the dots on the right in the raster direction which have no recording data.

For recording the two groups of recording data in the raster direction, the upper band or the lower band may be arbitrarily selected. However, in the second embodiment, in the case where a so-called "screen angle" is formed by appropriately shifting basic dots (basic cells) in units of the coordinates of a dithering matrix, the selection of the upper band or the lower band is determined based on the polarity of the screen angle.

By way of example, when the screen angle is positive, the right recording data extracted and added are assigned to the lower band, and the remaining left recording data are assigned to the upper band.

When the screen angle is negative, the right recording data extracted and added are assigned to the upper band, and the remaining left recording data are assigned to the lower band.

In the third embodiment, in accordance with the number of successive flags and the direction of the screen angle, the following conditions are predetermined: which of the dots should be used for extraction; how many recording data should be extracted; and to which of the dots the extracted recording data should be added.

By way of example, when the number of successive flags is two, process 2 is performed (step ST222). From among the recording data in two successive dots in the raster direction (as shown in FIG. 38), the right recording data is extracted and added to the dot positioned two dots right. When the screen angle is positive, the right recording data extracted and added is assigned to the lower band, and the other left recording data is assigned to the upper band.

Conversely, when the screen angle is negative, the right recording data extracted and added is assigned to the upper band, and the other left recording data is assigned to the lower band. In FIG. 38, "○" shows the existence of a recording data, and "x" shows no recording data.

Figure 39:
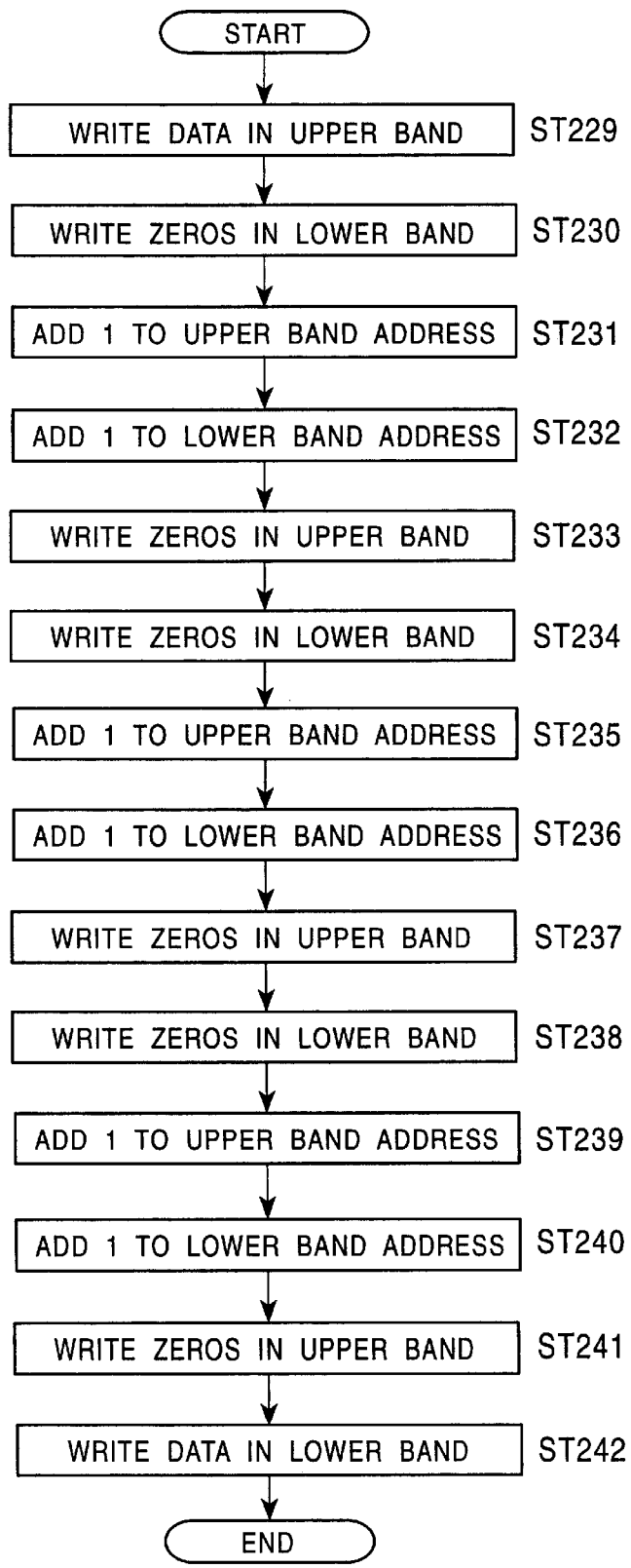
FIG. 39 is a flowchart showing process 2 shown in FIG. 37, which is performed at a positive screen angle.
Figure 40:
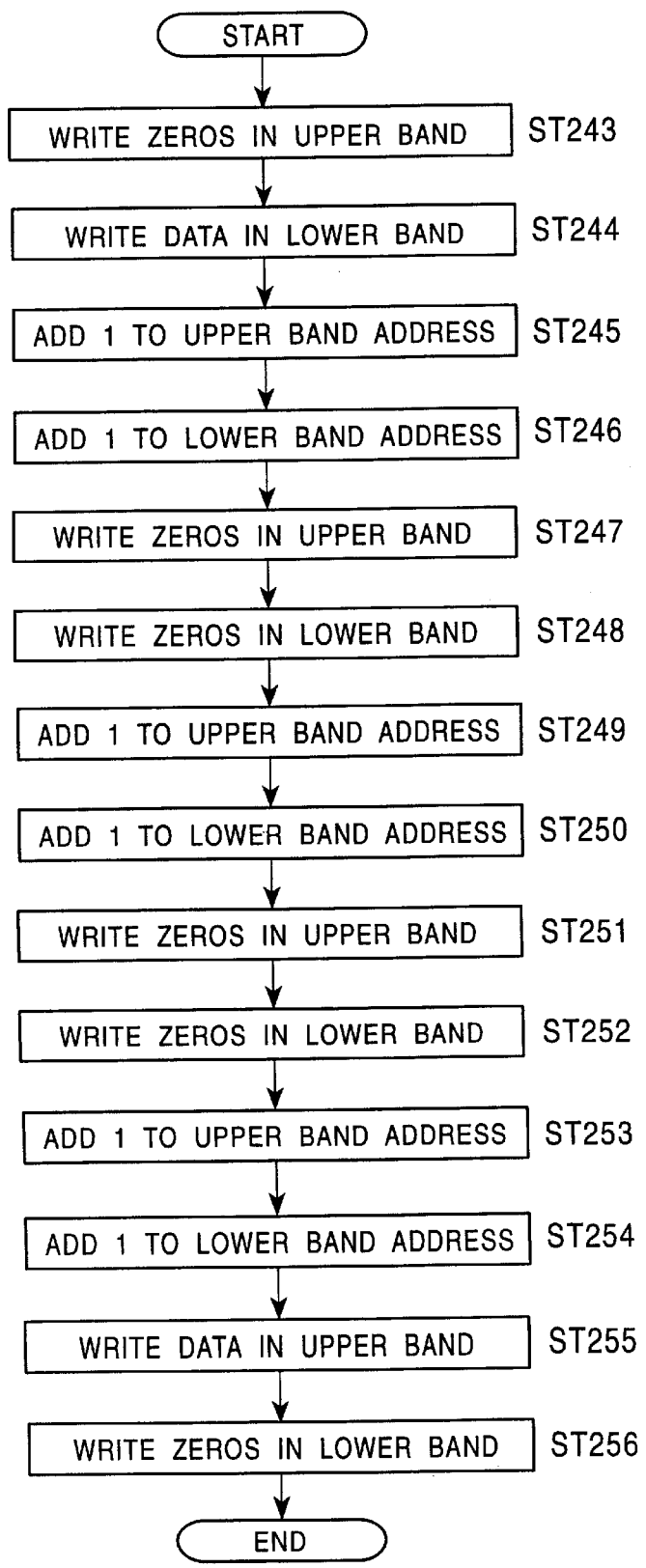
FIG. 40 flowchart showing process 2 shown in FIG. 37, which is performed at a negative screen angle.

Accordingly, as shown in FIG. 39, in the assignment of the recording data in the case where the number of successive flags is two and the screen angle is positive, the recording data are written in the upper band, as the recording data in the dots of the column having the first address, among the recording data in the dots provided with the successive flags (step ST229), and zeros (no recording data) are written in the lower band (step ST230). The addresses of the columns in the upper and lower bands are incremented by one (steps ST231 and ST232), and zeros as recording data in the dots of the next column are written in the upper and lower bands (steps ST233 and ST234). The addresses of the columns in the upper and lower bands are incremented by one (steps ST235 and ST236), and zeros as recording data in the dots of the next column are written in both the upper and lower bands (steps ST237 and ST238). The addresses of the columns in the upper and lower bands are incremented by one again (steps ST239 and ST240). Zeros are written in the upper band (step ST241), and recording data are written in the lower band (step ST242), whereby the assignment of the recording data is performed.

Figure 42:
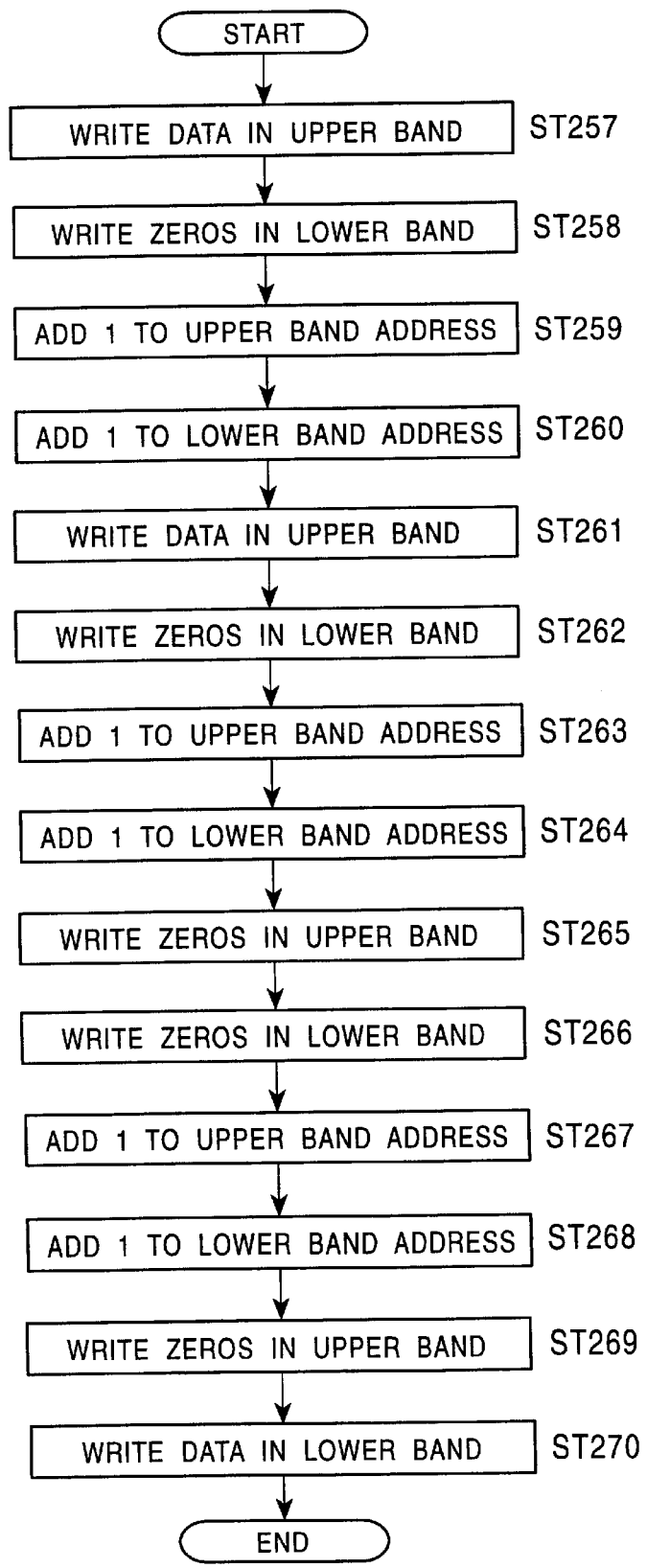
FIG. 42 is a flowchart showing process 3 shown in FIG. 37, which is the assignment of recording data when a screen angle is positive.

Referring to FIG. 42, the assignment of the recording data in the case where the number of successive flags is two and the screen angle is negative is set up such that the recording data are assigned to the upper and lower bands, symmetrically to the assignment in the case where the screen angle is positive. In the upper band, zeros are written as the recording data in the dots of the column having the first address (step ST243), and recording data are written in the lower band (step ST244). The addresses of the columns in the upper and lower bands are incremented by one (steps ST245 and ST246), and zeros as recording data in the dots of the next column are written in the upper and lower bands (steps ST247 and ST248). The addresses of the columns in the upper and lower bands are incremented by one (steps ST249 and ST250), and zeros as recording data in the dots of the next column are written in the upper and lower bands (steps ST251 and ST252).

The addresses of the columns in the upper and lower bands are incremented by one again (steps ST253 and ST254). Recording data are written in the upper band (step ST255), and zeros are written in the lower band (step ST256), whereby the assignment of the recording data is performed.

If the number of successive flags is three, process 3 is performed (step ST224). As shown in FIG. 41, from among the recording data in three successive dots in the raster direction, the most right recording data is extracted and added to the adjacent dot. When the screen angle is positive, the added recording data is assigned to the lower band, and the other recording data are assigned to the upper band.

Conversely, when the screen angle is negative, the added recording data is assigned to the upper band, and the other recording data are assigned to the lower band.

As shown in FIG. 42, in the assignment of the recording data in the case where the number of successive flags is three and the screen angle is positive, the recording data are written in the upper band, as the recording data in the dots of the column having the first address (step ST257), and zeros are written in the lower band (step ST258). The addresses of the columns in the upper and lower bands are incremented by one (steps ST259 and ST260). Recording data as the recording data in the dots of the next column are written in the upper band (step ST261), and zeros are written in the lower band (step ST262). The addresses of the columns in the upper and lower bands are incremented by one (steps ST263 and ST264), and zeros as recording data in the dots of the next column are written in the upper and lower bands (steps ST265 and ST266). The addresses of the columns in the upper and lower bands are incremented by one again (steps ST267 and ST268). Zeros are written in the upper band (step ST269), and recording data are written in the lower band (step ST270), whereby the assignment of the recording data is performed.

Figure 43:
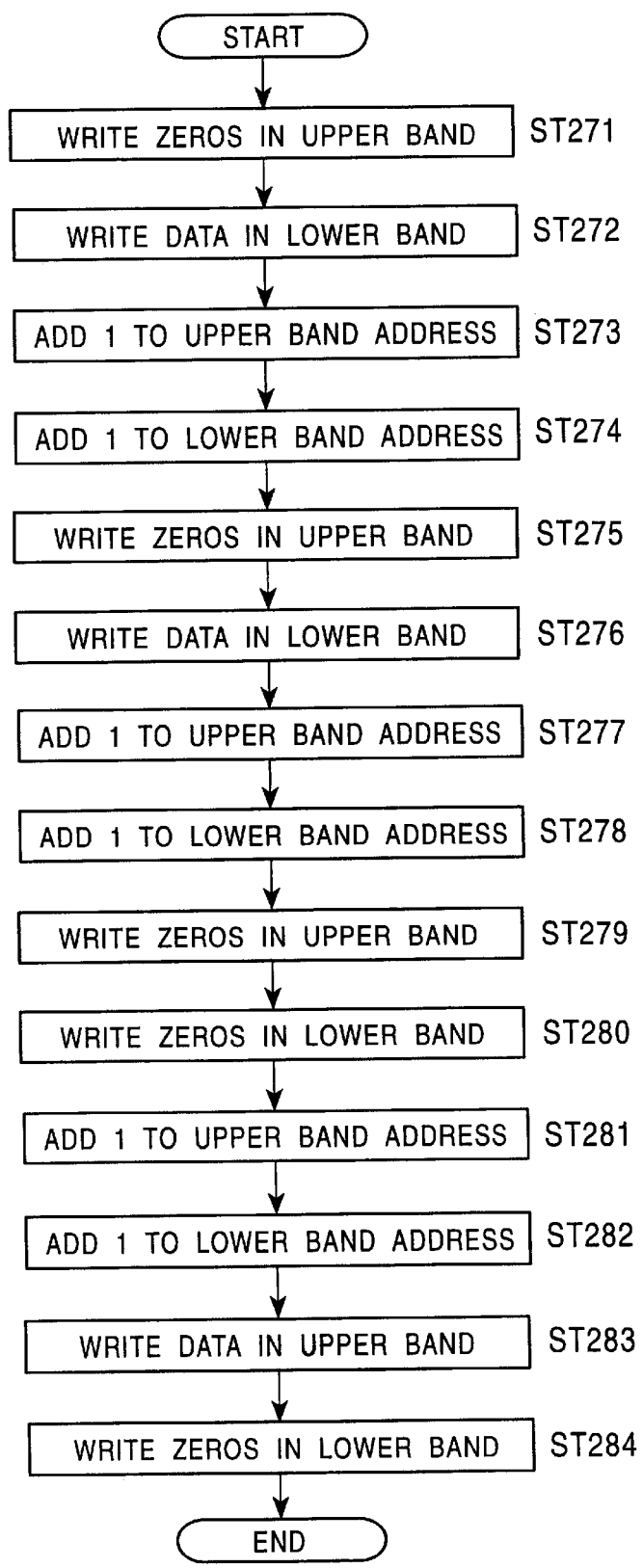
FIG. 43 is a flowchart showing process 3 shown in FIG. 37, which is the assignment of recording data when a screen angle is negative.

As shown in FIG. 43, in the assignment of the recording data in the case where the number of successive flags is three and the screen angle is negative, zeros are written in the upper band, as the recording data in the dots having the first address, among the dots provided with the successive flags (step ST271). and the recording data are written in the lower band (step ST272). The addresses of the columns in the upper and lower bands are incremented by one (steps ST273 and ST274), and zeros are written as the recording data in the dots of the next column (step ST275), and the recording data are written in the lower band (step ST276). The addresses of the columns in the upper and lower bands are incremented by one (steps ST277 and ST278), and zeros are written in the upper and lower bands, as the recording data in the dots of the next column (steps ST279 and ST280). The addresses of the columns in the upper and lower bands are incremented by one (steps ST281 and ST282). The recording data are written in the upper band (step ST283), and zeros are written in the lower band (step ST284), whereby the assignment of the recording data is performed.

Figure 44:
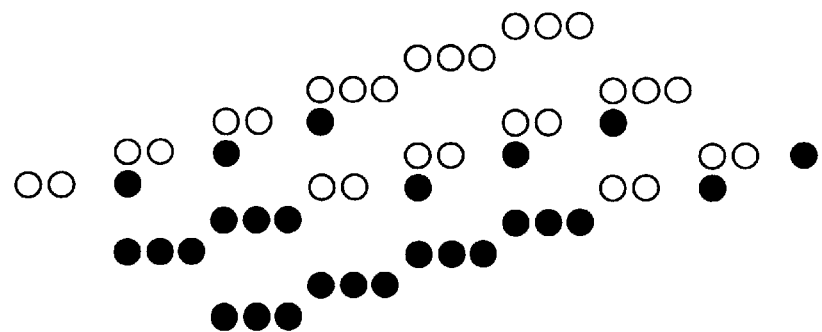
FIG. 44 is a drawing showing an overlapping area formed by an upper band and a lower band in the case where in an image recording method of the present invention, a screen angle is positive and a paper feeding pitch is appropriate.
Figure 45:
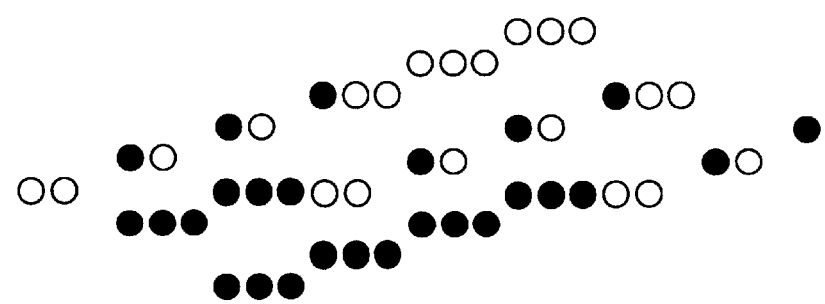
FIG. 45 is a drawing showing an overlapping area formed by an upper band and a lower band in the case where in an image recording method of the present invention, a screen angle is positive and a paper feeding pitch is narrow.
Figure 46:
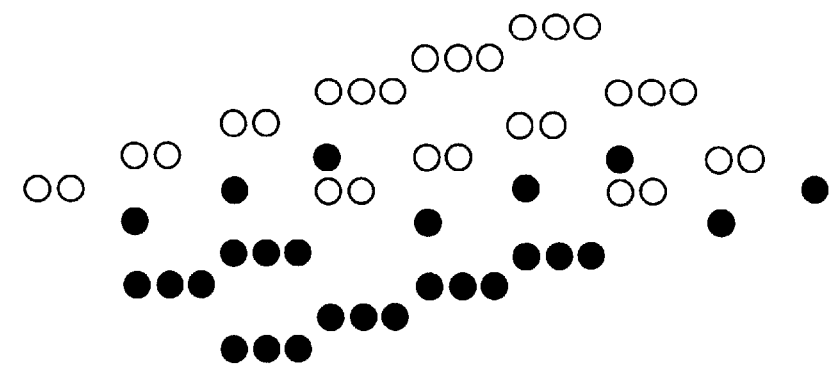
FIG. 46 is a drawing showing an overlapping area formed by an upper band and a lower band in the case where in an image recording method of the present invention, a screen angle is positive and a paper feeding pitch is wide.

When recording has been performed at a positive screen angle by using the assignment of recording data in the overlapping area in the case where the number of successive flags is three, recording patterns are as shown in FIGS. 44 to 46.

In the case where the paper feeding pitch is appropriate as shown in FIG. 44, neither black line nor white line is generated.

In the case where the paper feeding pitch is small as shown in FIG. 45, the most right dot (extracted and added dot) among the dots provided with the successive flags in the lower band covers the most left dot among the dots provided with the successive flags in the upper band so that the two dots look as one, and a blank is formed where the dot was extracted. Thus, an increase in the recording density is suppressed as a whole.

In the case where the paper feeding pitch is large as shown in FIG. 46, a record by the most right dot among the dots provided with the successive flags is formed between the upper and lower bands. Thus, the formation of a blank is suppressed, and a decrease in the recording density is prevented as a whole.

Figure 47:
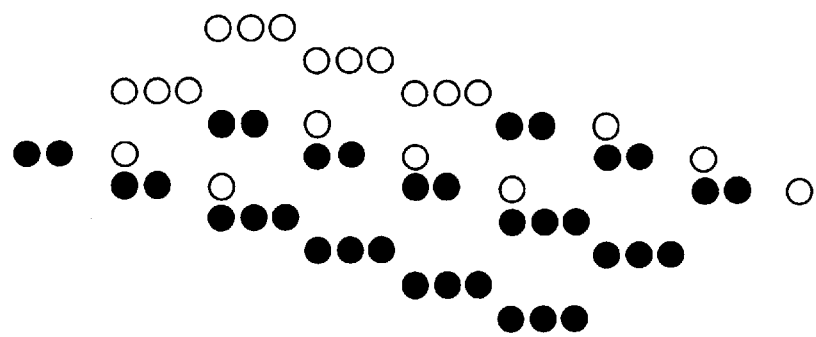
FIG. 47 is a drawing showing an overlapping area formed by an upper band and a lower band in the case where in an image recording method of the present invention, a screen angle is negative and a paper feeding pitch is appropriate.
Figure 48:
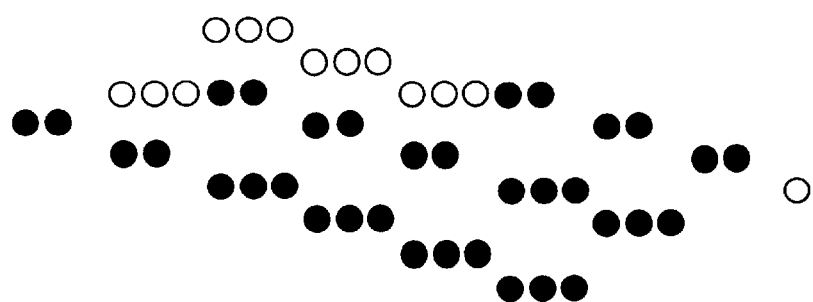
FIG. 48 is a drawing showing an overlapping area formed by an upper band and a lower band in the case where in an image recording method of the present invention, a screen angle is negative and a paper feeding pitch is narrow.
Figure 49:
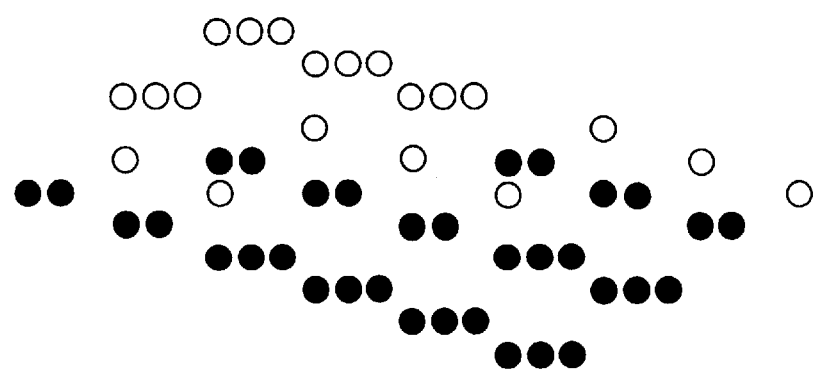
FIG. 49 is a drawing showing an overlapping area formed by an upper band and a lower band in the case where in an image recording method of the present invention, a screen angle is negative and a paper feeding pitch is wide.

Also, recording patterns in the case where recording is performed at a negative screen angle are in accordance with values of the paper feeding pitch, and are shown in FIGS. 47 to 49.

In the case where the paper feeding pitch is appropriate as shown in FIG. 47, neither black line nor white line is generated.

In the case where the paper feeding pitch is small as shown in FIG. 48, the most left dot (extracted and added dot) among the dots provided with the successive flags in the lower band covers the most right dot among the dots provided with the successive flags in the upper band so that the two dots look as one, and a blank is formed where the dot was extracted. Thus, an increase in the recording density is suppressed as a whole.

In the case where the paper feeding pitch is large as shown in FIG. 49, the most right dot among the dots provided with the successive flags remains between the upper and lower bands when recording is performed. Thus, the formation of a blank is suppressed, and a decrease in the recording density is prevented as a whole.

In the assignment of recording data, in addition to the above-described processing in which the right recording data are extracted and added, recording data may be separately added in accordance with the degree of paper feeding errors.

Figure 50:
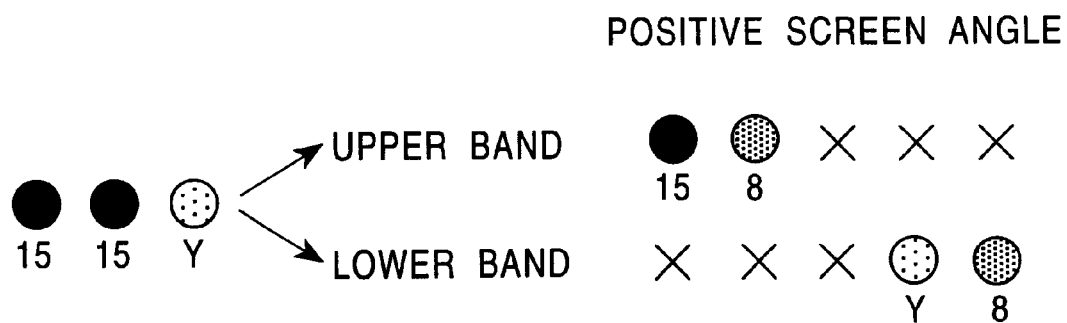
FIG. 50 is a drawing showing the assignment of recording data in the case where the number of successive flags is three.
Figure 51:
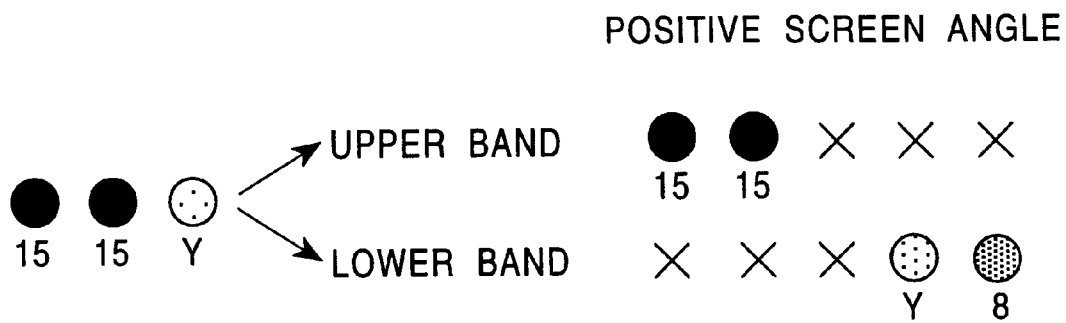
FIG. 51 is a drawing showing the assignment of recording data in the case where the number of successive flags is three.
Figures 52, 53:
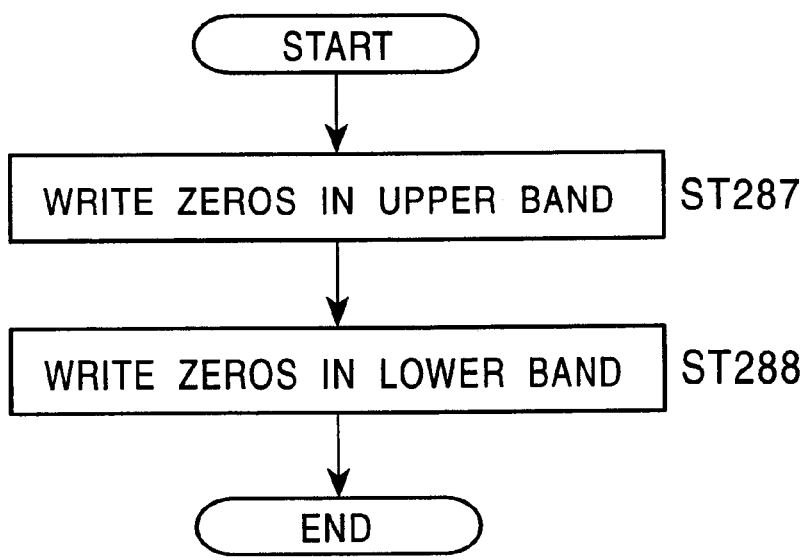
FIG. 52 is a flowchart showing process 0 shown in FIG. 37.
FIG. 53 is a drawing showing results of assignment by process 0 shown in FIG. 52.
Figure 54:
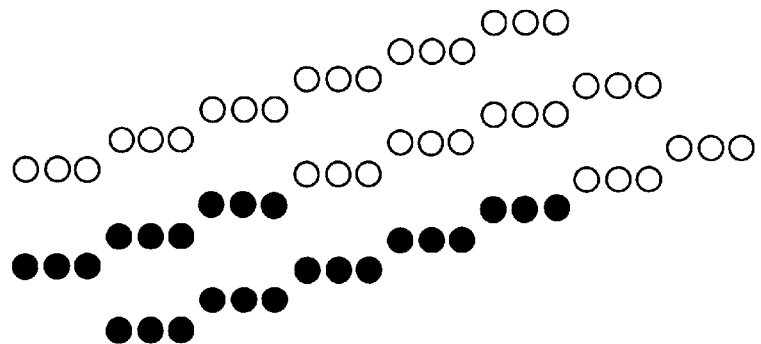
FIG. 54 is a drawing showing the recording pattern between an upper band and a lower band when in a conventional image recording method, a paper feeding pitch is appropriate.

By way of example, as shown in FIGS. 50 and 51, in the case where the number of successive flags is three, the recording data in the third dot among successive three dots may be extracted and shifted one dot right, and in accordance with the number of gradations, a recording data is added in the position of the fifth dot on the right of the extracted and added dot.

In the case where the number Y of gradations of a recording data in the third dot is 10 or less among gradations 1 to 15, as shown in FIG. 50, the recording data having gradation Y in the third dot is extracted and assigned to the fourth dot which is more right. At the same time, the number of gradations of a recording data in the second dot is reduced to eight, and recording data for the reduced eight gradations are assigned so as to be added in the position of the fifth dot.

In the case where the number Y of gradations of a recording data in the third dot is 11 or greater among gradations 1 to 15, as shown in FIG. 51, the recording data having gradation Y in the third dot is extracted and assigned to the fourth dot which is more right, and recording data for eight gradations are assigned so as to be added in the position of the fifth dot.

Figure 55:
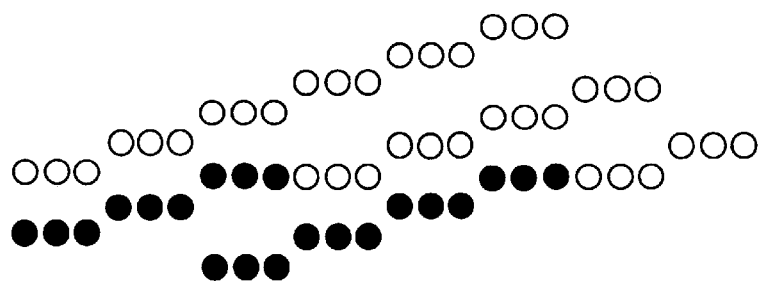
FIG. 55 is a drawing showing the recording pattern between an upper band and a lower band when an image recording method of the present invention, a paper feeding pitch is narrow.
Figure 56:
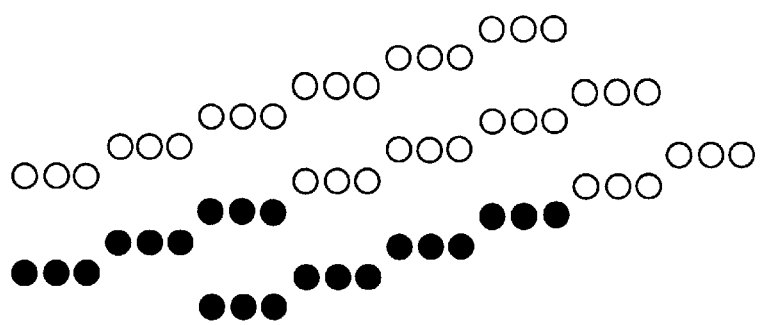
FIG. 56 is a drawing showing the recording pattern between a upper band and a lower band when an image recording method of the present invention, a paper feeding pitch is wide.
Figure 57:
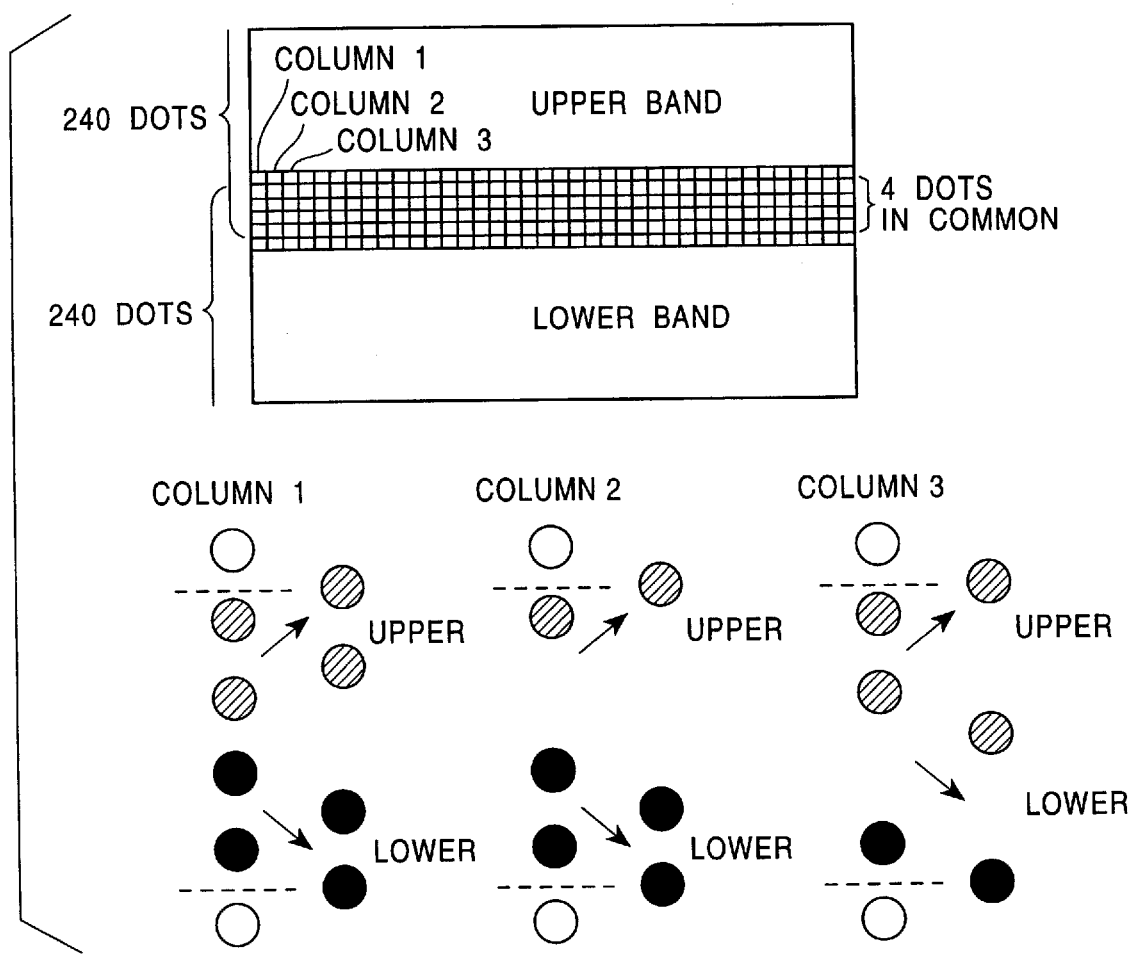
FIG. 57 is a drawing showing processing for recording by using an upper band and a lower band to overlap in a conventional image recording method.

In the case where the dots of the columns have no recording data, in other words, the number of successive flags is zero, the addresses of the columns in the upper and lower bands are stored (step ST285), and process 0 is performed (step ST286). In process 0, as shown in FIG. 55, zero are written in the upper band, as the recording data of the dots in the column (step ST287), and zeros are written in the lower band (step ST288). This assigns recording data, as shown in FIG. 56.

At the completion of the above-described steps, the successive flags are cleared (step ST289), and the raster processing for the 238th dot is complete.

As described above, after the assignment of recording data in the 238th dot, raster processing for the 239th dot as shown in FIG. 33 is performed (step ST290), and raster processing for the 240th dot is performed (step ST291).

Subsequently, the address is shifted for the next column (step ST292), and it is determined whether recording data assignment for all the columns has been performed (step ST293). If it has been performed, the assignment of recording data is complete. If it has not been performed, recording data assignment for all the columns is repeatedly performed.

The third embodiment describes the assignment of the recording data of the 238th dot. However, assignment of recording data in the present invention is not limited to that in the third embodiment. In the present invention, recording data are arbitrarily assigned to the upper and lower bands in accordance with image information, etc. Also the assignment of the recording data of the 239th and 240th dots is arbitrarily performed.

By causing the thermal head to operate based on the recording data assigned using the above-described processes, the desired recording is performed.

By assigning, based on information of, e.g., cyan, magenta, and yellow images, the recording data for a plurality of colors, the appropriate recording of full color images can be performed. The assignment of each color may be performed by the same technique or by a different technique for each color. For example, when a magenta ink ribbon is used to perform recording, the assignment of recording data for performing recording at a positive screen angle is performed, and when a cyan ink ribbon is used to perform recording, the assignment of recording data for performing recording at a negative screen angle is performed.

Also, by assigning, based on monochrome image information, recording data, the appropriate recording of monochrome images can be performed.

Accordingly, in third embodiment, in the case where dots in the raster direction have recording data, successive flags are provided to the dots, and only when the dots have no recording data, the recording data in the dots provided with the successive flags are provided to the upper and lower bands. Therefore, compared with a conventional technique in which recording data are assigned for each column, the assignment of the recording data is simplified, which greatly reduces the amount of processing, and which enables facile and rapid processing. Thereby, the assignment time is approximately ½, compared with that in the conventional technique. Thus, a high recording speed is realized, and by changing the diameter of each dot, the image recording method of the present invention can cope with even a case requiring multigradation recording.

In addition, by performing the steps of extracting recording data in some dots among dots provided with successive flags; adding the extracted recording data to dots in the raster direction which have no recording data; and assigning the recording data to a upper band and a lower band, it is possible to suppress an increase in a recording density which is caused by succession of recording dots in the upper and lower bands when a paper feeding pitch is small, and to suppress a decrease in the recording density which is caused by blanks formed between the upper and lower bands when the paper feeding pitch is large. Thus, this prevents black lines and white lines from appearing in recording images.

The present invention is not limited to the foregoing embodiments, but may be modified if necessary.

The foregoing embodiments describe the foregoing image recording methods as types of image recording method for thermal transfer printers. However, the present invention is not limited to the image recording method for thermal transfer printers, but may be applied to serial ink-jet printers, etc.

What is claimed is:

1. An image recording method comprising the steps of:
feeding recording paper so that recording is performed by using an upper band as a recording area formed by one scan of a recording head, and a lower band as a recording area formed by the next scan of said recording head so as to overlap in a plurality of dots;
performing assignment of recording data in the dots in the overlapping recording area to said upper band and said lower band; and
driving, based on the assigned recording data, the recording elements of said recording head to perform recording;
wherein the assignment comprises the steps of:
successively identifying each dot of said recording head in the scanning direction thereof;
providing successive flags to the dots when the dots have the recording data; and
dividing, into two groups, the recording data in the successive dots provided with said successive flags only when no recording data is detected, and assigning the groups to said upper band and said lower band;
wherein when recording is performed at a negative screen angle obtained by shifting an arrangement of basic cells downward, among the recording data in the successive dots divided into the two groups in the scanning direction of said recording head, the recording data on the left of the scanning direction are assigned to said lower band, and the recording data on the right of the scanning direction are assigned to said upper band, and
when recording is performed at a positive screen angle obtained by shifting the arrangement of basic cells, among the recording data in the successive dots divided into the two groups in the scanning direction of said recording head, the recording data on the left of the scanning direction are assigned to said upper band, and recording data on the right of the scanning direction are assigned to said lower band.

2. An image recording method according to claim 1, wherein based on information on at least cyan, magenta, and yellow images, the recording data corresponding to the colors are assigned for performing full color recording.

3. An image recording method according to claim 1, wherein recording data as monochrome image information are assigned for performing monochrome recording.

4. An image recording method comprising the steps of:
feeding recording paper so that recording is performed by using an upper band as a recording area formed by one scan of a recording head, and a lower band as a recording area formed by the next scan of said recording head so as to overlap in a plurality of dots;
performing assignment of recording data in the dots in the overlapping recording area to said upper band and said lower band; and
driving, based on the assigned recording data, the recording elements of said recording head to perform recording;
wherein the assignment comprises the steps of:
successively identifying each dot of said recording head in the scanning direction thereof;
providing successive flags to the dots when the dots have the recording data;
extracting the recording data in at least one dot from among the recording data in the successive dots provided with said successive flags only when no recording data is detected, and adding the extracted recording data to another dot in the scanning direction which has no recording data; and
assigning the extracted and added recording data to said upper band and said lower band.

5. An image recording method comprising the steps of:

feeding recording paper so that recording is performed by using an upper band as a recording area formed by one scan of a recording head, and a lower band as a recording area formed by the next scan of said recording head so as to overlap in a plurality of dots;

performing assignment of recording data in the dots in the overlapping recording area to said upper band and said lower band; and driving, based on the assigned recording data, the recording elements of said recording head to perform recording;

wherein the assignment comprises the steps of:

successively identifying each dot of said recording head in the scanning direction thereof;

providing successive flags to the dots when the dots have the recording data;

extracting the recording data in at least one dot from among the recording data in the successive dots provided with said successive flags only when no recording data is detected, and adding the extracted recording data to another dot in the scanning direction which has no recording data; and assigning the extracted and added recording data to said upper band and said lower band;

wherein among the recording data in the successive dots, the right recording data are extracted and added to the right dots having no recording data, and when recording is performed at a positive screen angle, the added recording data are assigned to said lower band, and the other recording data are assigned to said upper band, while when recording is performed at a negative screen angle, the added recording data are assigned to said upper band, and the other recording data are assigned to said lower band.

6. An image recording method according to claim 5, wherein based on information on at least cyan, magenta, and yellow images, the recording data corresponding to the colors are assigned for performing full color recording.

7. An image recording method according to claim 5, wherein recording data as monochrome image information are assigned for performing monochrome recording.

* * * * *